(12) United States Patent
Deal

(10) Patent No.: US 10,807,661 B2
(45) Date of Patent: Oct. 20, 2020

(54) MOBILE DISTRIBUTION PLATFORM APPARATUS AND METHODS USED THEREIN

(71) Applicant: Troy L. Deal, Abilene, TX (US)

(72) Inventor: Troy L. Deal, Abilene, TX (US)

( * ) Notice: Subject to any disclaimer, the term of this patent is extended or adjusted under 35 U.S.C. 154(b) by 0 days.

(21) Appl. No.: 16/143,385

(22) Filed: Sep. 26, 2018

(65) Prior Publication Data

US 2019/0210674 A1    Jul. 11, 2019

Related U.S. Application Data

(60) Provisional application No. 62/563,454, filed on Sep. 26, 2017.

(51) Int. Cl.
| | |
|---|---|
| *B62D 63/08* | (2006.01) |
| *B65D 88/12* | (2006.01) |
| *B65D 88/54* | (2006.01) |
| *B65D 88/00* | (2006.01) |

(52) U.S. Cl.
CPC ........... *B62D 63/08* (2013.01); *B65D 88/005* (2013.01); *B65D 88/127* (2013.01); *B65D 88/129* (2013.01); *B65D 88/542* (2013.01)

(58) Field of Classification Search
CPC .... B62D 63/08; B65D 88/005; B65D 88/127; B65D 88/129; B65D 88/542
See application file for complete search history.

(56) References Cited

U.S. PATENT DOCUMENTS

| | | | |
|---|---|---|---|
| 6,179,535 B1* | 1/2001 | Bouchard | B60J 5/08 296/24.4 |
| 9,567,168 B1* | 2/2017 | Tibbens | B65G 63/002 |
| 9,884,734 B1* | 2/2018 | Garner | B65G 63/002 |
| 2018/0257880 A1* | 9/2018 | Garner | B65G 67/20 |
| 2019/0210674 A1* | 7/2019 | Deal | B62D 63/08 |

* cited by examiner

*Primary Examiner* — Kaitlin S Joerger
(74) *Attorney, Agent, or Firm* — Ray A. Ekstrand

(57) ABSTRACT

A mobile distribution platform apparatus and method utilizing an over the road tractor platform constructed to be freely movable upon the road system. A plurality of ramps are each pivotally joined to the platform and each pivotable between a raised travel configuration and lowered to an extending loading configuration. Each ramp further includes a plurality of adjustable removable support jacks which may be installed on the underside of a ramp and extend downwardly therefrom to provide support for the ramp in its loading configuration. The mobile distribution platform provides a transportation and distribution hub which may be located as required without the need of stationary support facilities. In addition to providing a road transport hub, the present invention mobile distribution platform also provides the capability to locate adjacent a section of railroad track without the need of supporting stationary facilities.

9 Claims, 37 Drawing Sheets

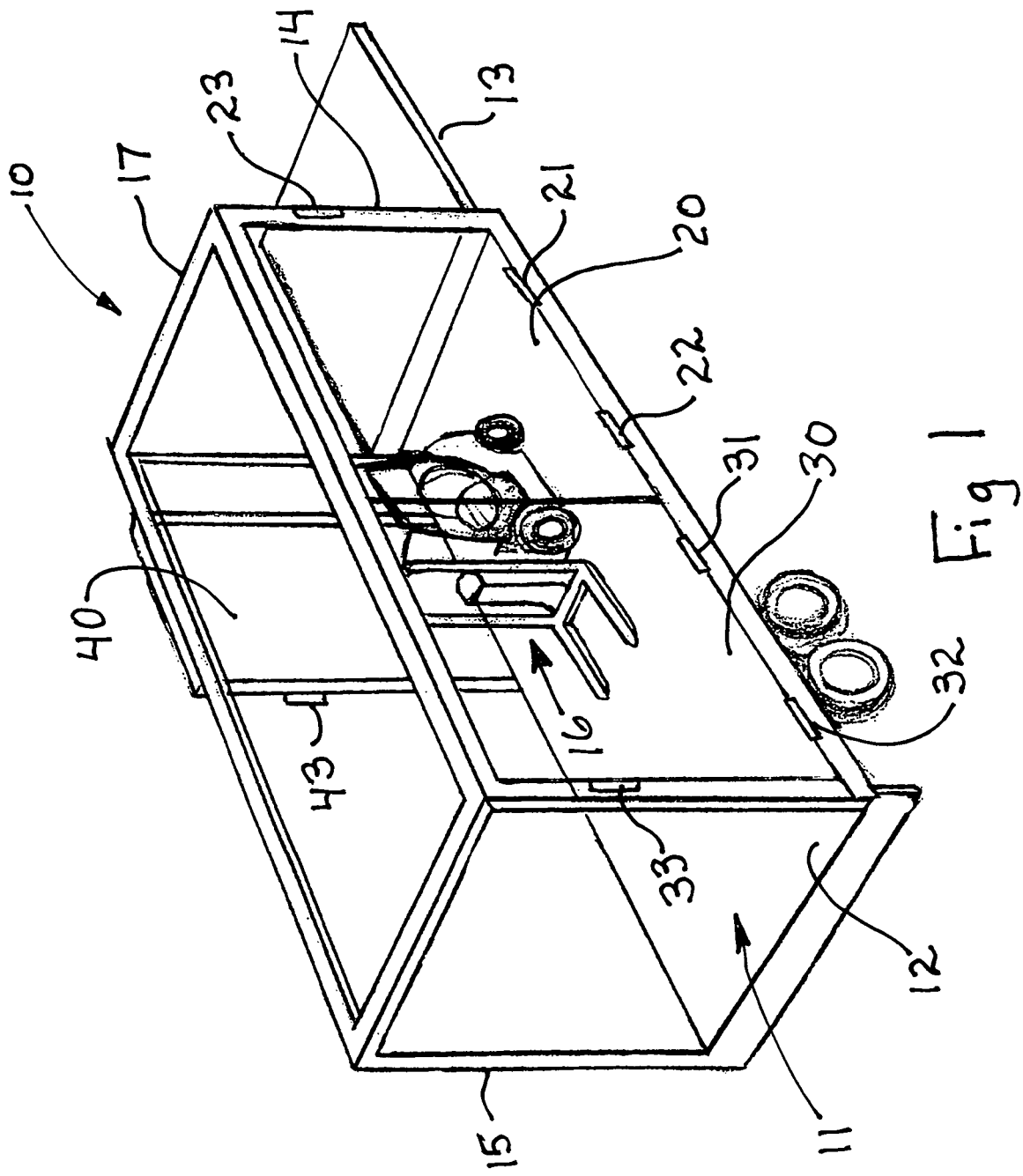

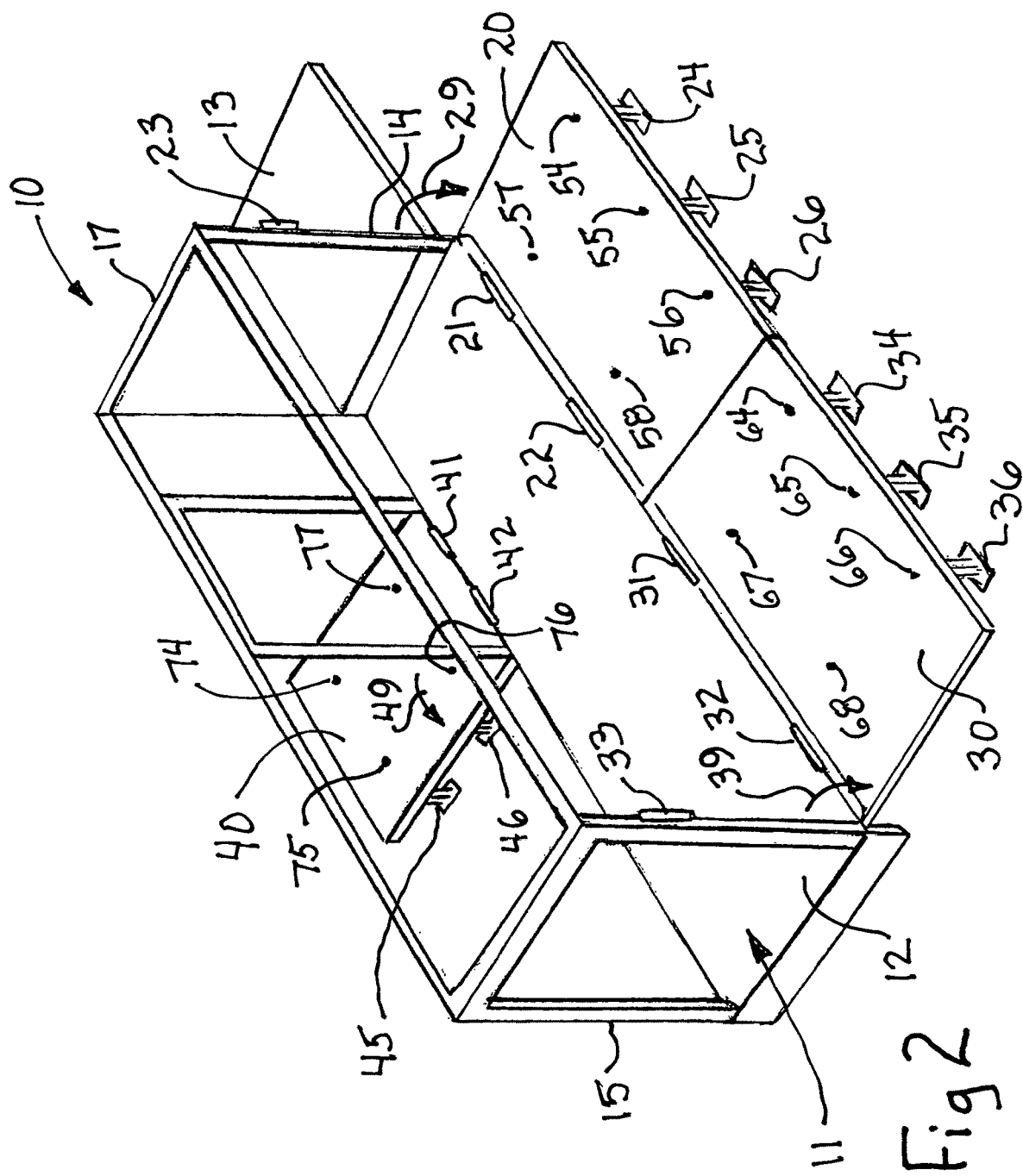

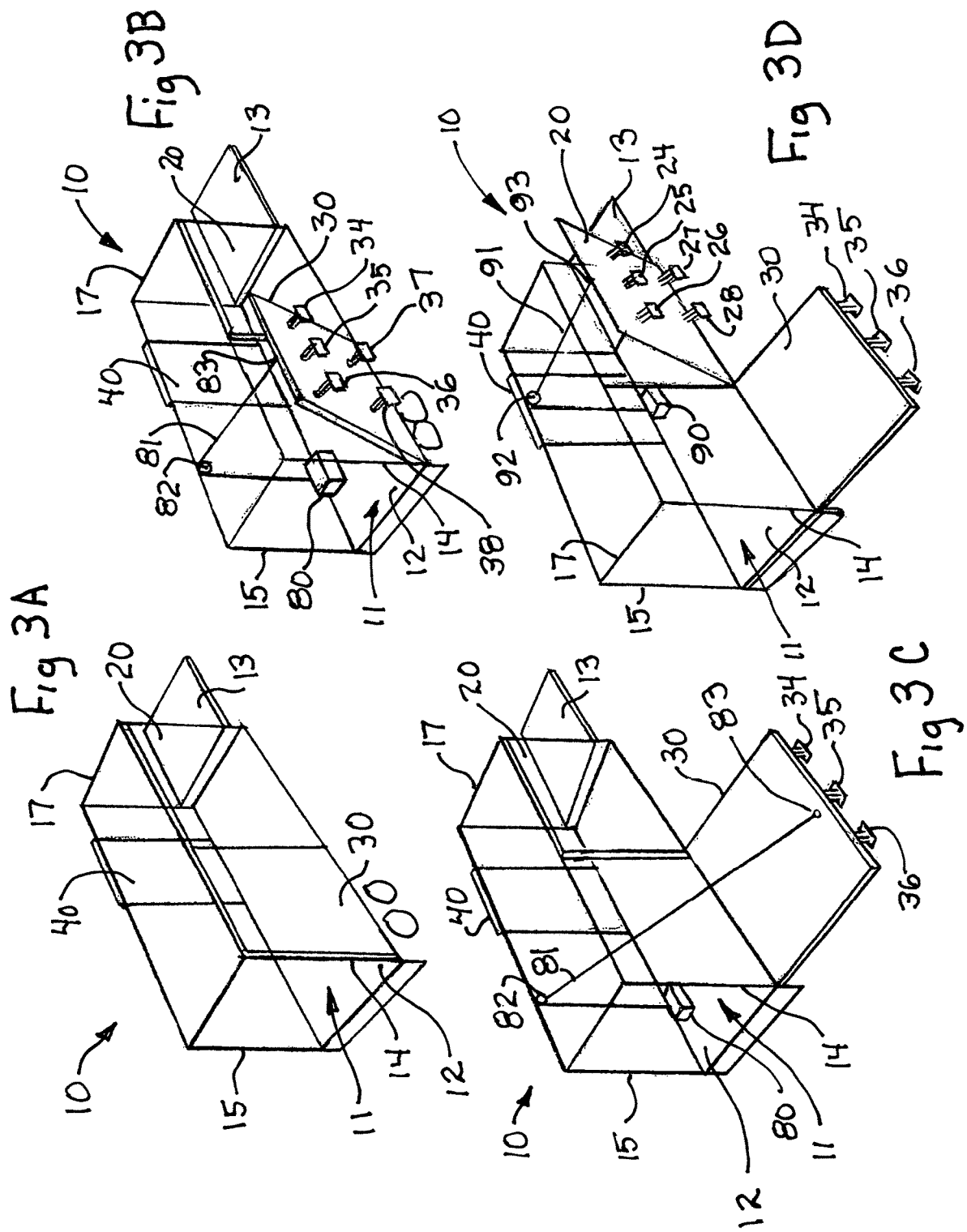

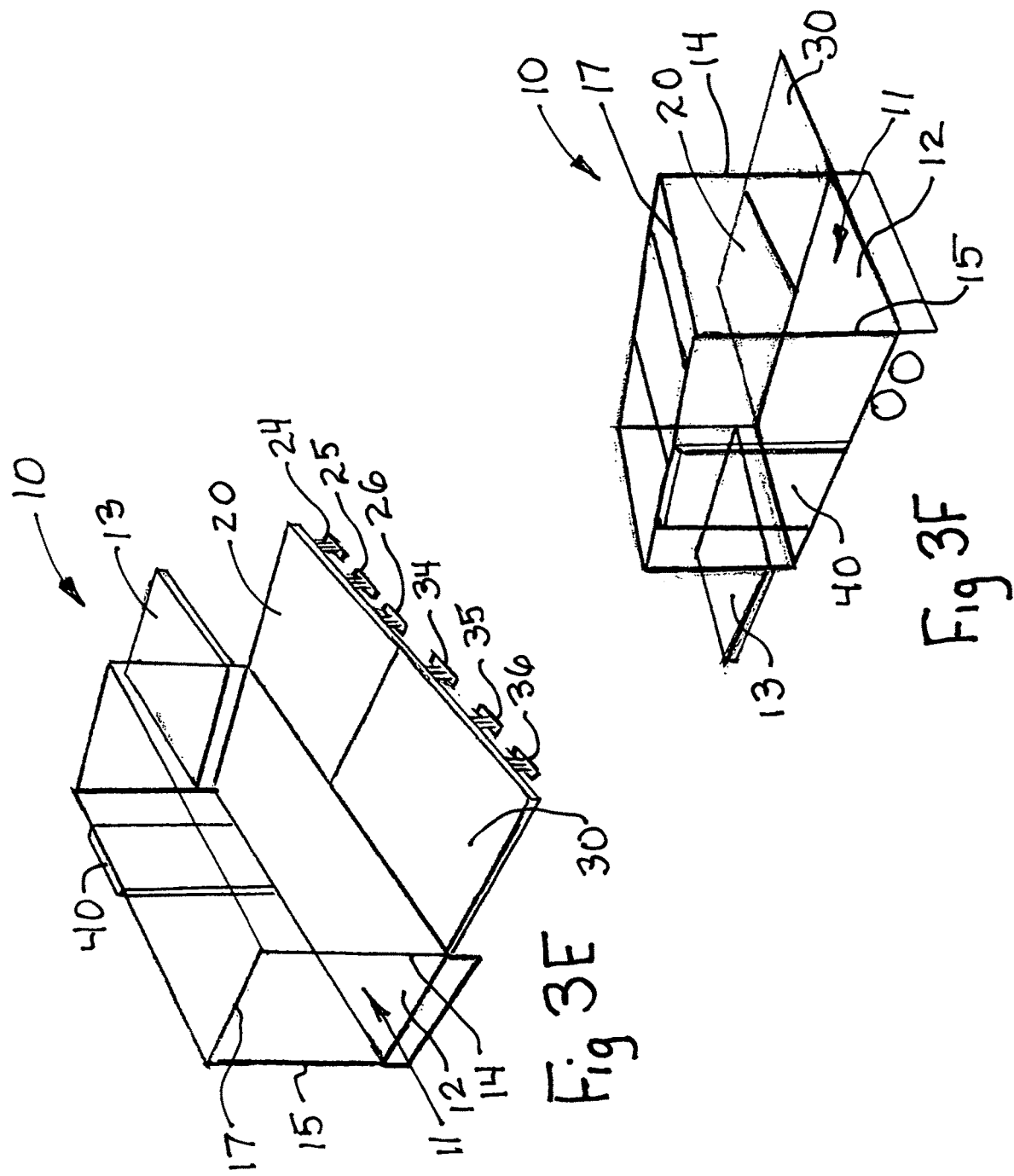

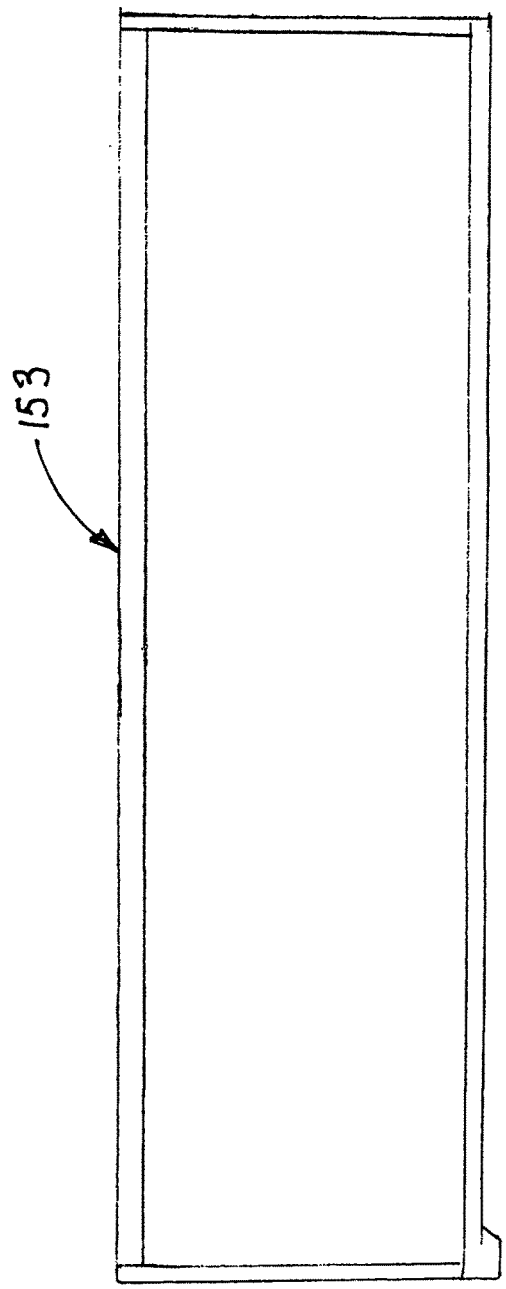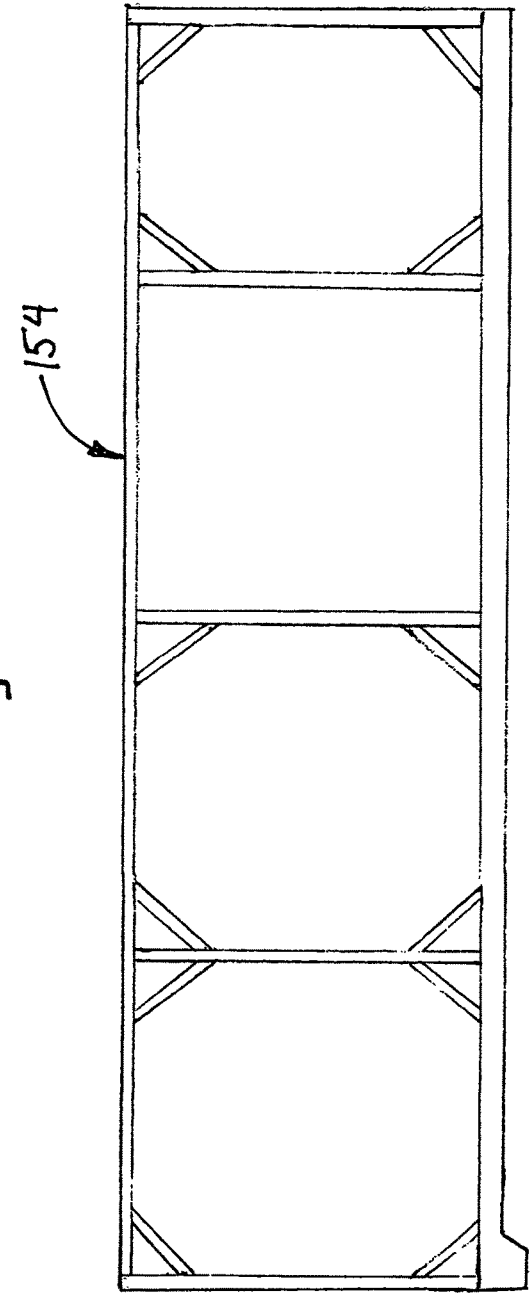
Fig 12
Fig 13

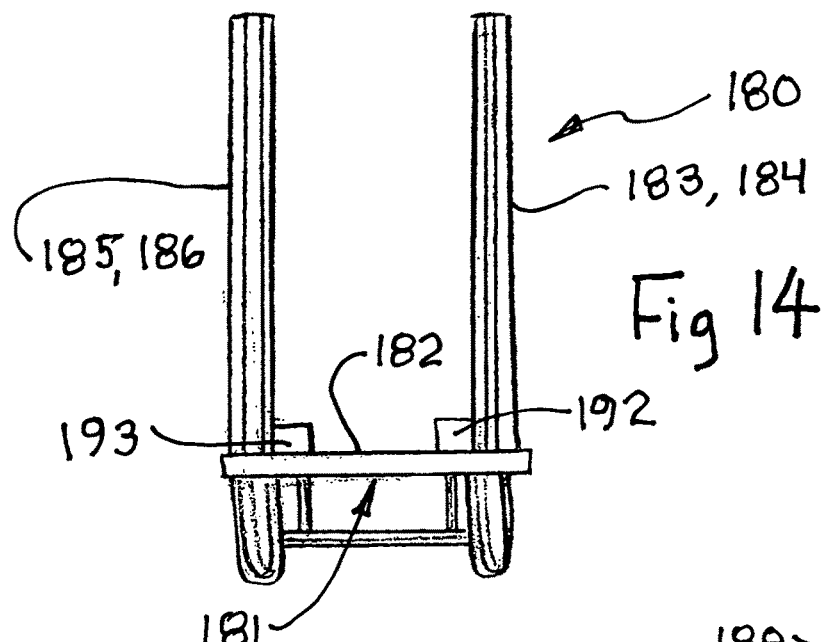
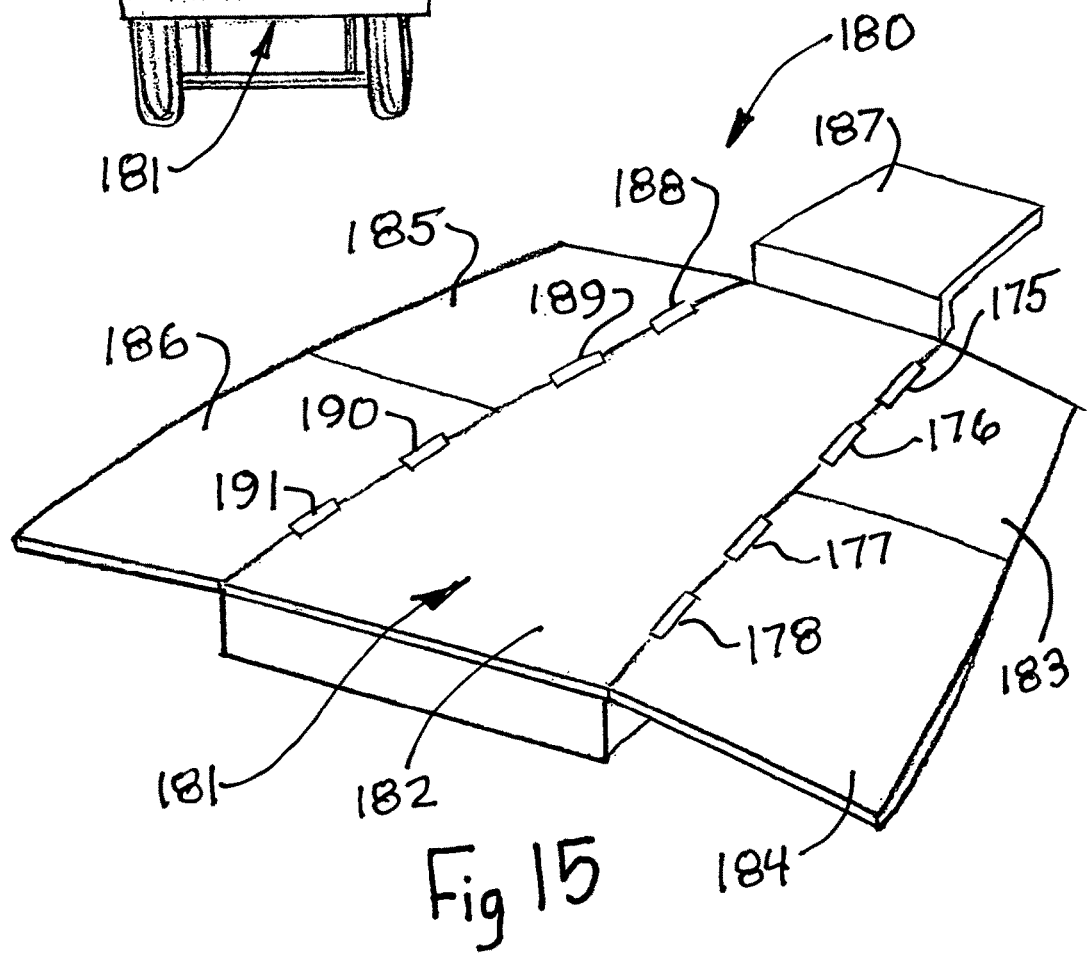

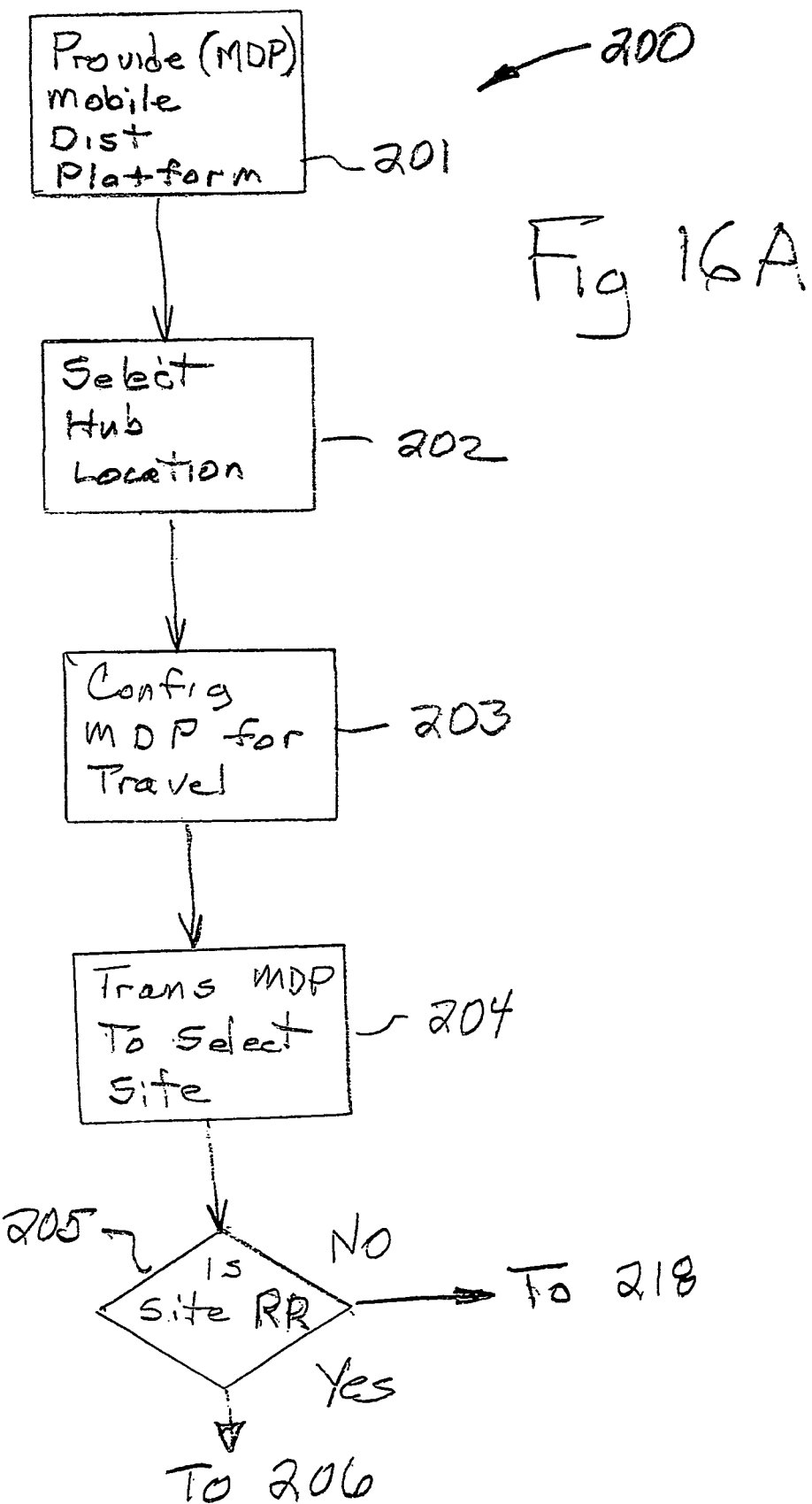

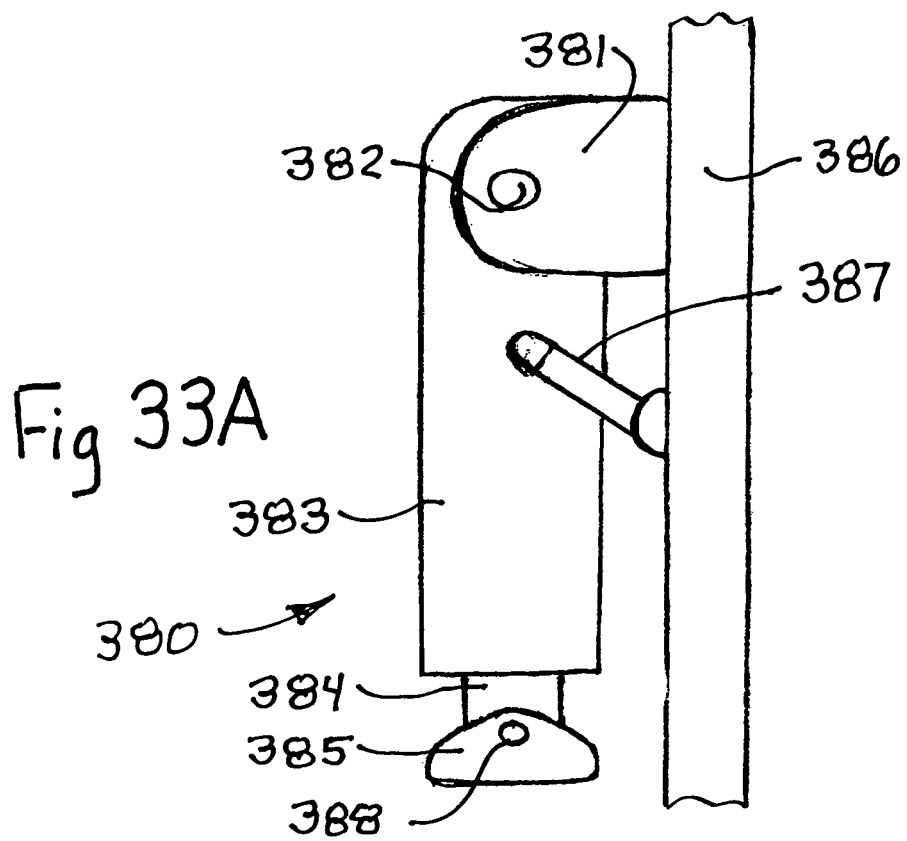
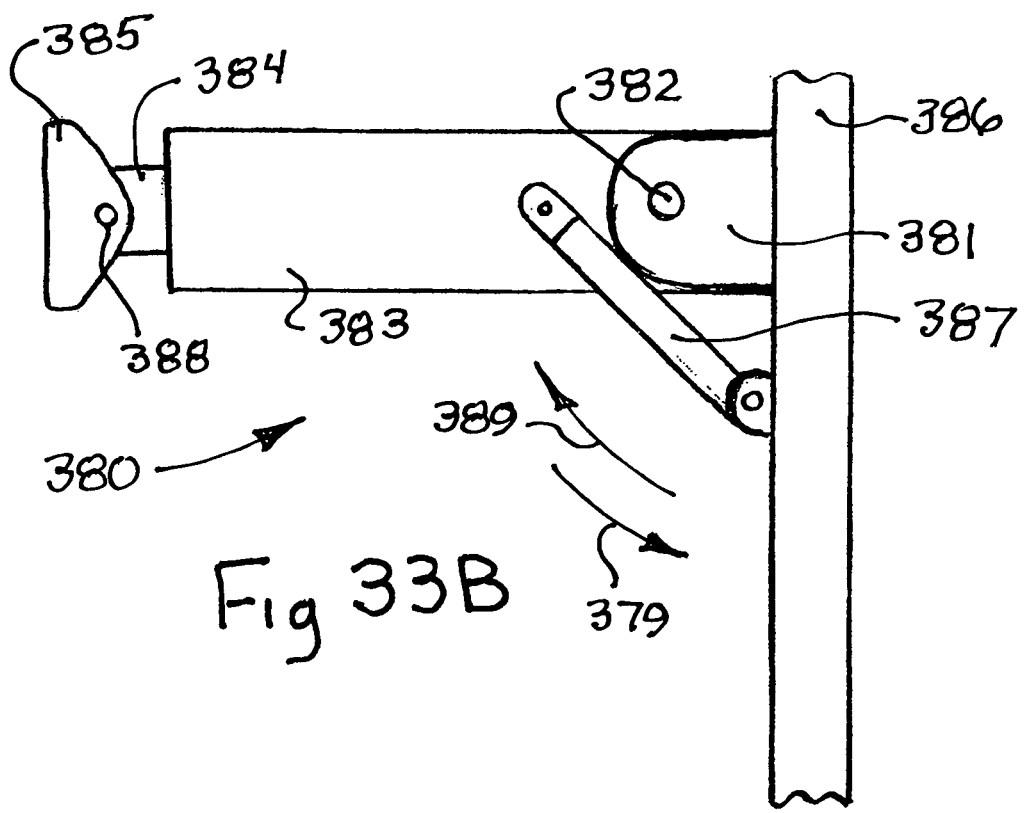

MOBILE DISTRIBUTION PLATFORM APPARATUS AND METHODS USED THEREIN

CROSS-REFERENCE TO RELATED APPLICATION

This application claims the benefit of and priority under 35 U.S.C. 119(e) of U.S. Provisional Patent Application No. 62/563,454 entitled MOBILE DISTRIBUTION PLATFORM APPARATUS AND METHODS USED THEREIN, filed Sep. 26, 2017, in the name of Troy L. Deal, the disclosure of which is incorporated herein by reference.

FIELD OF THE INVENTION

This invention relates generally to the transportation and distribution of products, commodities and resources and relates particularly to apparatus and methods used in such transportation and distribution.

BACKGROUND OF THE INVENTION

In modern industrial societies the products, commodities and resources used within communities of the society typically flow through extensive networks of road, rail and air transportation. For the most part, consumers within such modern industrialized societies tend to locate within areas of population concentration forming cities, towns and other locales.

In most societies the areas within which products, commodities and other resources are created and processed tend to be grouped within certain regions in response to their individual requirements. Thus, for example, facilities which grow food products tend to locate near the agricultural land which produces the products. Similarly, facilities of an industrialized character tend to locate near labor-rich population and near transportation hubs. This creates a situation in which the creation and production of products commodities and resources also tends to be concentrated in certain regions of the society As a result of the typical systems for transport and distribution of products, commodities and resources operating in combination with the typical localized regions for creation and manufacturer of products, commodities and resources the modern apparatus and methods employed in the transportation and distribution of products, commodities and resources tend to develop complex and extensive networks of transportation, storage and distribution throughout the society.

While such complex networks generally provide adequate service under normal conditions, they typically lack the flexibility required to meet regional needs that arise in the course of changes and surges in consumer demand. In the normal course of life, communities are subject to unforeseen often damaging events. Events such as so-called "natural disasters" which include storms, fires, earthquakes, droughts and so on, are capable of devastating a community or region and rendering most of its installed support systems in adequate or totally in operative. These events place the inhabitants at great risk and hardship. They also create intense urgent and immediate consumer needs and demands or products, commodities and resources.

Other events which are often referred to as "man-made" such as combat, riots, terrorism attacks or other population attacks by hostile nations are similarly able to subject a community or region to sudden intense hardship and shortages of products, commodities and resources. Such man-made disasters are in many respects more unforeseen and unpredictable than many of the so-called natural disasters referred to above.

Unfortunately, present-day systems and methods used to form the complex networks which are relied upon for the transportation and distribution of products, commodities and resources lack the flexibility of response necessary to meet the sudden demands caused by either natural disasters or man-made disasters and ultimately prove to be inadequate. In most disaster situations, hard-hit and devastated communities and regions suffer exceedingly as well-intentioned responders struggle unsuccessfully to transport and distribute necessary products, commodities and resources to the stricken areas. Simply stated, the transportation and distribution systems "clog up" and become subject to unforeseen bottlenecks that arise within the transportation and distribution apparatus and system.

As a result, there arises and remains an urgent and unresolved need in the art for methods and apparatus that are capable of providing greater flexibility of response in the transportation and distribution of products, commodities and resources in coping with such natural and man-made disasters the need arises to introduce sufficient flexibility into the transportation and distribution system within critical regions or areas of the system to avoid creation of bottlenecks and system breakdown characterizing present day transportation and distribution systems.

SUMMARY OF THE INVENTION

Accordingly, it is a general object of the present invention to provide an improved apparatus and method for transportation and distribution of products, commodities and resources. It is a more particular object of the present invention to provide an improved apparatus and method for transportation and distribution of products, commodities and resources that provides flexibility of transportation and distribution whereby more effective response to changes of consumer requirements and demands such as those created by natural and man-made disasters may be realized.

The present invention provides a mobile distribution platform apparatus and method utilizing an over the road tractor platform constructed to be freely movable upon the road system. The mobile distribution platform supports a plurality of ramps each pivotally joined to the tractor platform and each pivotable between a raised travel configuration and lowered to an extending loading configuration. Each ramp further includes a plurality of adjustable removable support jacks which may be installed on the underside of a ramp and extend downwardly there from to provide support for the ramp in its loading configuration. The mobile distribution platform may be configured in its loading configuration at any desired location and may immediately provide a distribution function by which a plurality of tractor trailers may be loaded and unloaded to provide the transport and distribution of products, commodities and resources. Thus, the mobile distribution platform provides a transportation and distribution hub which may be located as required without the need of stationary support facilities. In addition to providing a road transport hub, the present invention mobile distribution platform also provides the capability to locate adjacent a section of railroad track upon which a plurality of rail cars are located. The mobile distribution platform may be positioned at any track segment without the need of supporting stationary facilities. When positioned adjacent a railroad track segment, the mobile distribution platform provides a loading and unloading facility by which railcars may be unloaded and their contents delivered or distribution to a plurality of over the road tractor trailer units. In accordance with an important aspect of the present invention, the mobile characteristic of the mobile distribution platform is able to be moved from railcar to railcar during the loading and unloading process without the need of a railroad engine to move the rail cars.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 1 sets forth a perspective view of a mobile distribution platform constructed in accordance with the present invention in its closed configuration;

FIG. 2 sets forth a perspective view of a mobile distribution platform constructed in accordance with the present invention in its open loading configuration;

FIGS. 3A through 3H set forth sequential perspective views of the present invention mobile distribution platform transformed from its closed configuration to its open extending loading configuration;

FIG. 12 sets forth a passenger side support frame of the present invention mobile distribution platform;

FIG. 13 sets forth a driver side support frame of the present invention mobile distribution platform;

FIG. 14 sets forth a rear view of an alternate embodiment of the present invention mobile distribution platform;

FIG. 15 sets forth a perspective view of the alternate embodiment of the present invention mobile distribution platform set forth in FIG. 14 in its open extending loading configuration;

FIGS. 16A through 16D, taken together, set forth operational flow diagrams of the present invention method;

FIGS. 33A and 33B sets forth side views of an illustrative ramp support jack in its travel and support position respectively;

DESCRIPTION OF THE PREFERRED EMBODIMENTS

Figure 3G:
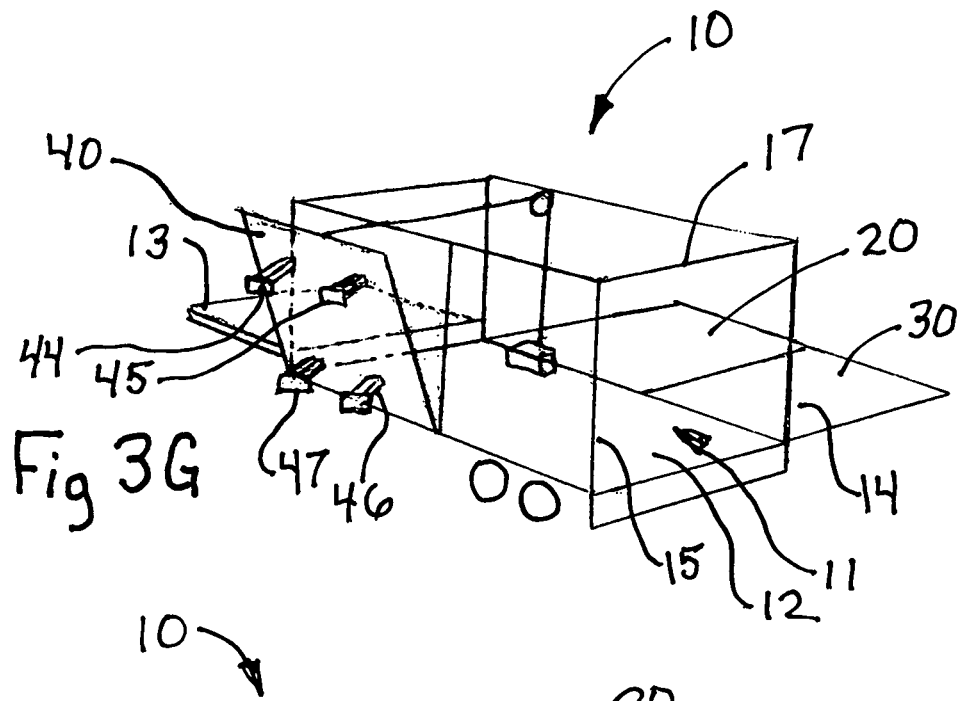

FIG. 1 sets forth a perspective view of a mobile distribution platform constructed in accordance with the present invention and generally referenced by numeral 10. Mobile distribution platform 10 is fabricated to be used in combination with a conventional over the road tractor (not shown) in the same manner as conventional tractor-trailer combinations are utilized. Accordingly, mobile distribution platform 10 includes a trailer bed 11 supporting a bed surface 12 and having a forwardly extending tractor coupler 13. Tractor coupler 13 will be understood to include conventional coupler apparatus (not shown) of the type commonly used in coupling a trailer to a tractor for over the road transportation. In further accordance with the present invention, mobile distribution platform 10 includes a pair of side frames 14 and 15 supported upon and extending upwardly from trailer bed 11. A top frame 17 is joined to the upper edges of side frames 14 and 15 by conventional welding attachment.

Mobile distribution platform 10 further includes a plurality of generally planar ramps 20, 30 and 40 each pivotally secured to a supporting edge of trailer bed 11 by a plurality of hinges. For purposes of illustration in FIG. 1, ramps 20, 30 and 40 are depicted in a "see-through" characteristic that allows the interior of mobile distribution platform 10 and its contents to be visible in the perspective view provided by FIG. 1. It will be understood however that this see-through depiction is provided solely for illustrative convenience in FIG. 1 and it will be further understood that ramps 20, 30 and 40 are in fact typically fabricated of an opaque high-strength steel plate material, or the like. Thus, ramp 20 is pivotally secured to trailer bed 11 by a pair of hinges 21 and 22. Similarly, ramp 30 is pivotally secured to trailer bed 11 by a pair of hinges 31 and 32. While not seen in FIG. 1 due to the perspective view thereof, it will be understood that ramp 40 is pivotally secured to trailer bed 11 by a similar pair of hinges. The structure of hinges 21, 22, 31 and 32 is set forth in greater detail below in FIG. 4. Suffice it to note here, that in accordance with an important aspect of the present invention, ramps 20, 30 and 40 are each pivotally movable upon trailer bed 11 between a raised travel configuration, shown in FIG. 1, and an extending loading configuration, shown in FIG. 2. It will be further noted that the vertical positions of ramps 20, 30 and 40 in the raised travel configuration of FIG. 1 are maintained by a plurality of latches 23, 33 and 43 operative upon ramps 20, 30 and 40 respectively to secure our each ramp in its raised travel configuration. An illustrative structure for latches 23, 33 and 43 is set forth below in FIG. 6 in greater detail. Suffice it to note here that latches 23, 33 and 43 function to securely maintain the raised travel configuration of each respective ramp to maintain the configuration of mobile distribution platform 10 shown in FIG. 1 which facilitates movement of mobile distribution platform 10 upon conventional roadways in compliance with all transportation rules and laws. For purposes of convenience, mobile distribution platform 10 further supports a conventional loader 16 which may, for example, comprise a conventional "fork-lift" or other preferred apparatus to be used in material handling once mobile distribution platform 10 reaches the site of operation. In the preferred fabrication of the present invention, trailer bed surface 12 as well as the surfaces of ramps 20, 30 and 40 are formed of a high strength material such as steel plate, or the like. The essential quality of surface material used is that of providing sufficient load bearing strength and rigidity to serve as a "dock" surface over which heavy equipment may roll.

FIG. 2 sets forth a perspective view of mobile distribution platform 10 in its extending loading configuration. The operation of mobile distribution platform 10 will be described below in greater detail. However, suffice it to note here that, in accordance with an important aspect of the present invention, mobile distribution platform 10, when configured in its extending loading configuration illustrated in FIG. 2, provides a platform upon which one or more material handling devices such as loader 16 (seen in FIG. 1) may operate to transfer products, commodities and resources between transportation units which are positioned in proximity to mobile distribution platform 10 in the manner illustrated below in FIGS. 7A and 7B. As a result, mobile distribution platform 10 provides a highly flexible element for utilization within transportation and distribution networks that allows the establishment of a transportation and distribution "hub" at virtually any location within the network that is completely independent of permanent transportation and distribution facilities. This flexibility facilitates the immediate establishment of a transportation and distribution site capable of meeting urgent and unforeseen consumer demands and requirements. Thus, in the face of events of the type mentioned above in which products, commodities and resources are urgently required at unforeseen locations and in unforeseen quantities, the present invention mobile distribution platform may be quickly brought to a critical distribution bottleneck and configured to function as a distribution hub to provide an immediate flow of critical materials.

More specifically, FIG. 2 sets forth mobile distribution platform 10, which as is described above, includes a trailer bed 11 upon which a bed surface 12 is supported. Trailer bed 11 further supports forwardly extending tractor coupler 13 together with side support frames 14 and 15. A top support frame 17 is joined to the upper edges of side support frames 14 and 15 by conventional welding or other attachment (not shown). As is also described above, mobile distribution platform 10 supports a plurality of ramps 20, 30 and 40. Ramps 20, 30 and 40 are pivotally secured to trailer bed 11 by a plurality of hinges 21, 22, 31, 32, 41 and 42. The extending loading configuration of mobile distribution platform 10 is provided by pivoting ramps 20, 30 and 40 downwardly about their respective hinges to the generally horizontal platform orientations shown in FIG. 2 in the sequence of movements set forth in FIGS. 3A through 3H.

The differences between the raised travel configuration shown in FIG. 1 and the extending loading configuration shown in FIG. 2 of mobile distribution platform 10 are best understood by comparison of FIGS. 1 and 2. Accordingly, with mobile distribution platform 10 initially in the raised travel configuration of FIG. 1 which is suitable for transport, ramp 20 is then pivoted from its vertical orientation downwardly in the direction indicated by arrow 29 to the generally horizontal orientation shown in FIG. 2 by releasing latch 23 and pivoting ramp 20 in the manner shown in below in FIG. 3D. With continued concurrent reference to FIGS. 1 and 2, ramp 30 is similarly pivoted from its vertical orientation downwardly in the direction indicated by arrow 39 to the generally horizontal orientation shown in FIG. 2 by releasing latch 33 and pivoting ramp 30 in the manner shown in below in FIG. 3B. Finally, ramp 40 is pivoted from its vertical orientation downwardly in the direction indicated by arrow 49 to the generally horizontal orientation shown in FIG. 2 by releasing latch 43 and pivoting ramp 40 in the manner shown in below in FIG. 3G. It will be apparent to those skilled in the art that the present invention mobile distribution platform is not limited to the above illustrated sequence for positioning ramps 20, 30 and 40. Ramps 20, 30 and 40 may be pivoted in any desired order to configure mobile distribution platform 10 into the extending loading configuration shown in FIG. 2 without departing from the spirit and scope of the present invention. It will also be noted that the present invention mobile distribution platform is not limited to any particular configuration or number of ramps. The essential function of the ramps operating in the present invention mobile distribution platform is to provide a plurality of ramps that are joined to trailer bed 11 in a manner that facilitates alternative configuration for either the raised travel configuration or the extending loading configuration as desired.

Figure 5:
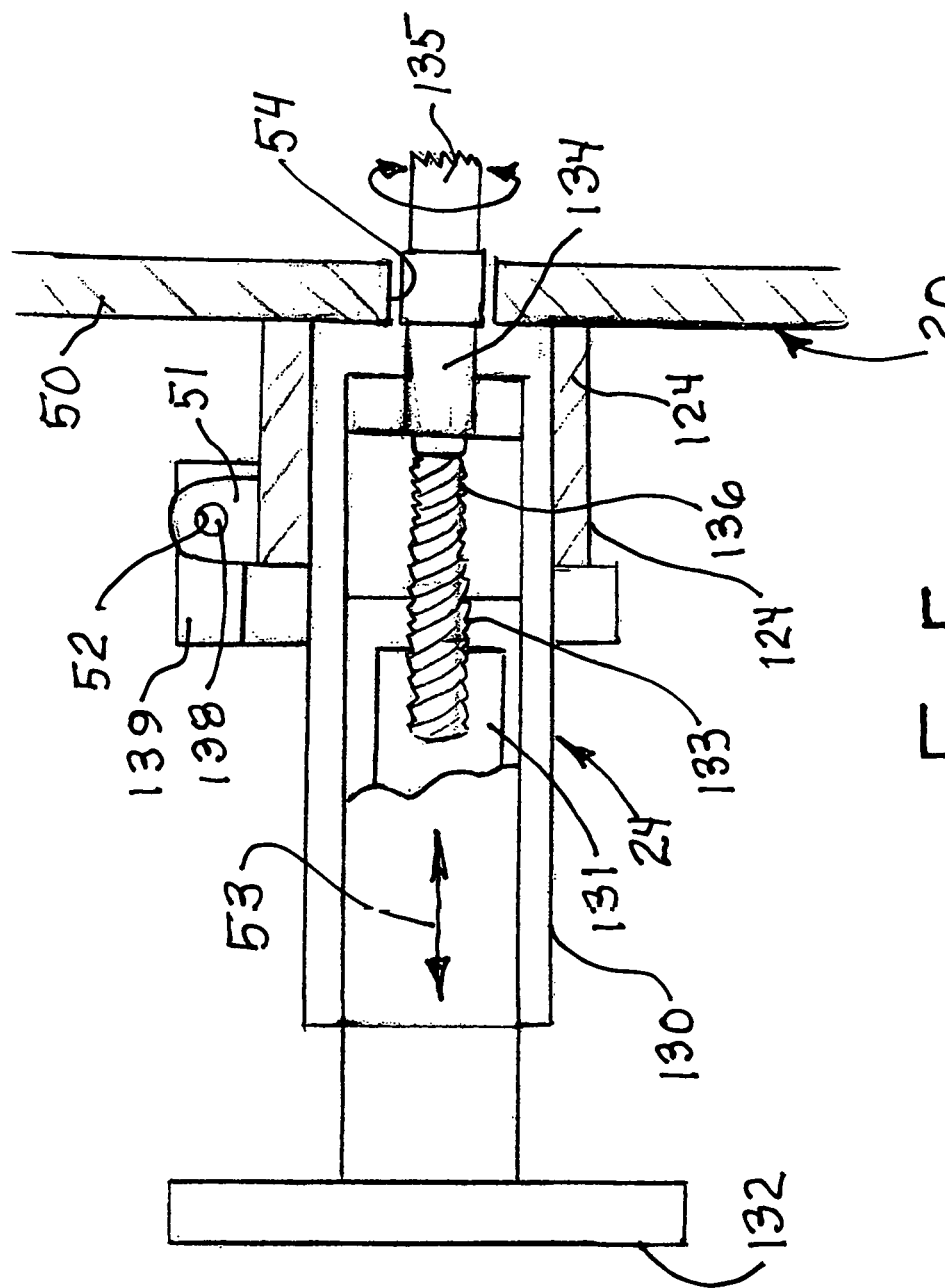
FIG. 5 sets forth a section view of an illustrative adjustable support jack utilized in the present invention mobile distribution platform.
Figure 9:
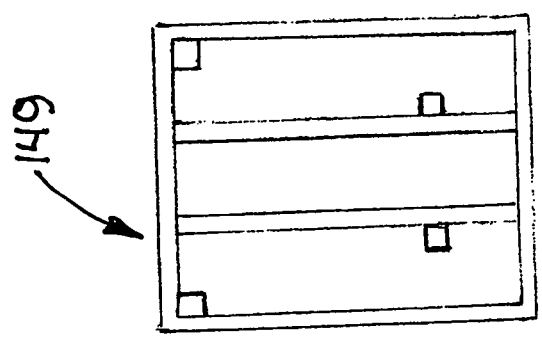
FIG. 9 sets forth a ramp support frame of the present invention mobile distribution platform.
Figure 8:
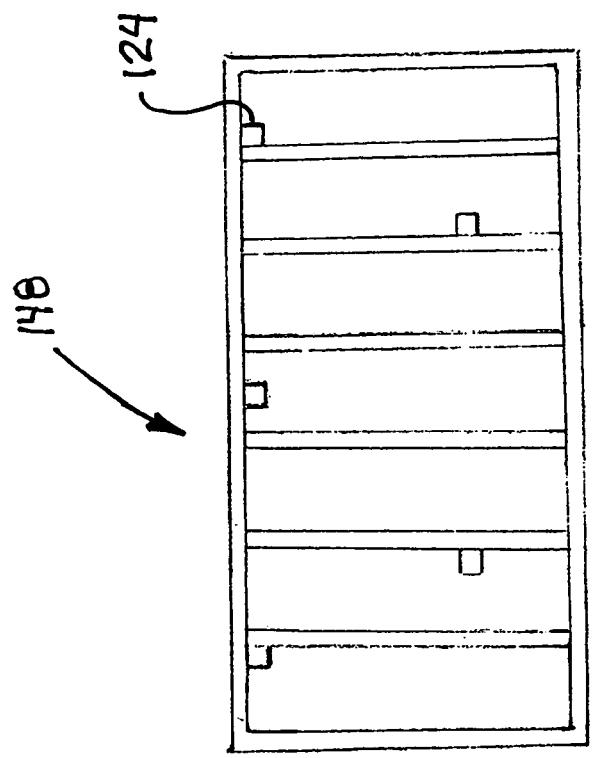
FIG. 8 sets forth a ramp support frame of the present invention mobile distribution platform.

In accordance with an important aspect of the present invention, ramps 20, 30 and 40 are each provided with additional support when positioned in the extending loading configuration by a plurality of downwardly extending adjustable support jacks that are assembled to the underside of each ramp during the lowering process. An illustrative structure for these adjustable support jacks is set forth below in FIG. 5 in greater detail. However, suffice it to note here that each of the support jacks is adjustable in height allowing the operator to accommodate surface contours beneath each of the ramps and, through adjustment of the support jacks, provide solid level support for each of ramps 20, 30 and 40 when mobile distribution platform 10 is in its extending loading configuration. As is also shown in greater detail in FIG. 5, each adjustable support jack is positioned in alignment with an aperture formed in the ramp surface through which an adjustment tool may be inserted from above the ramp to carry forward the support jack adjustment and ramp leveling process. In the preferred fabrication of the present invention, each support jack is removably joined to the support frame of its ramp by insertion of the upper end of the support jack into a receiving socket positioned within the underside of the ramp support frame as is seen in FIG. 5. FIGS. 8 and 9 illustrate support jack receiving socket locations for ramps 20, 30 and 40. It will be apparent to those skilled in the art that different numbers of supporting jacks and corresponding support jack receiving sockets may be utilized to meet various ramp loading requirements without departing from the spirit and scope of the present invention.

More specifically, ramp 20 is supported by support jacks 24, 25, 26, 27 and 28 (support jacks 27 and 28 seen in FIG. 3D) each received within a corresponding support jack receiving socket arranged in the manner set forth below in FIG. 8. Correspondingly, ramp 20 defines apertures 54 through 58 which provide access for the above mentioned height adjustment tool to be applied to support jacks 24 through 28 respectively. In operation, support jacks 24 through 28 are assembled to the underside of ramp 20 during the lowering process in the manner shown in FIG. 3D. Once ramp 20 is pivoted to a generally horizontal orientation, the operator adjusts the heights of support jacks 24 through 28 by inserting an adjustment tool through apertures 54 through 58 and establishing a support jack height for each support jack until a solid and stable horizontal support of ramp 20 has been provided.

In a similar manner, ramp 30 is supported by support jacks 34 through 38 (support jacks 37 and 38 seen in FIG. 3B) each received within a corresponding support jack receiving socket arranged in the manner set forth below in FIG. 8. Correspondingly, ramp 30 defines apertures 64 through 68 which provide access for the above mentioned height adjustment tool applied to support jacks 34 through 38 respectively. In operation, support jacks 34 through 38 are assembled to the underside of ramp 30 during the lowering process in the manner shown in FIG. 3B. Once ramp 30 is pivoted to a generally horizontal orientation, the operator adjusts the individual heights of support jacks 34 through 38 by inserting an adjustment tool through apertures 64 through 68 and adjusting each support jack until a solid and stable horizontal support of ramp 30 has been provided.

Finally, ramp 40 is supported by support jacks 44 through 47 (support jacks 44 and 47 seen in FIG. 3G) each received within a corresponding support jack receiving socket arranged in the manner set forth below in FIG. 9. Correspondingly, ramp 40 defines apertures 74 through 67 which provide access for the above mentioned height adjustment tool applied to support jacks 44 through 47 respectively. In operation, support jacks 44 through 47 are assembled to the underside of ramp 40 during the lowering process in the manner shown in FIG. 3G. Once ramp 40 is pivoted to a generally horizontal orientation, the operator adjusts the respective heights of each of support jacks 44 through 47 by inserting an adjustment tool through apertures 74 through 77 and rotating the tool until a solid and stable horizontal support of ramp 40 has been provided.

Thus, in accordance with an important aspect of the present invention mobile distribution platform 10 may be configured in its raised travel configuration and transported over conventional roads facilities utilizing a conventional over the road tractor (not shown). In further accordance with an important aspect of the present invention, mobile distribution platform 10 may be placed at virtually any location without the need of supporting facilities or assets. Once mobile distribution platform 10 has been transported to the needed location, it is then reconfigured to the extending loading configuration and thereafter functions as a transportation and distribution hub without the need of additional supporting facilities or assets. By way of example and not limitation, the present invention mobile distribution platform may be positioned at virtually any site such as unused airport facilities, large parking lots, large road sections, vacant land and land adjacent to railroad track segment's or the like as a result, the flexibility of the existing transportation and distribution systems is greatly enhanced and bottlenecks otherwise encountered in emergency situations may be avoided.

It will be apparent to those skilled in the art that a variety of apparatus may be utilized in raising and lowering the pivotal ramps of the present invention mobile distribution platform without departing from the spirit and scope of the present invention. Otherwise conventional apparatus such as electrically powered actuators, hydraulic drive actuators or powered winches together with suitable cable and pulley arrangements are examples of the many types of apparatus which may be utilized with the essential function being the capability of raising and lowering the pivotally supported ramps of the present invention mobile distribution platform.

By way of overview, FIGS. 3A through 3H set forth sequential illustrations by which the present invention mobile distribution platform may be transformed from its raised travel configuration to its extending loading configuration utilizing a combination of conventional powered winches, cables and pulleys. It will be understood that FIGS. 3A through 3H set forth "simplified" figures for mobile distribution platform 10 in that certain structural details, such as latches 23, 33 and 43 as well as hinges 21, 22, 31, 32, 41 and 42 are omitted from the figures. It will be further understood that the use of such simplified figures for FIGS. 3A through 3H is intended to facilitate an understanding of the sequential movements of ramps 20, 30 and 40 as mobile distribution platform 10 is configured from its raised travel configuration (shown in FIG. 3A) to its extending loading configuration (shown in FIG. 3H). Thus, it will be understood that the various structural elements and structural details set forth in the remaining figures for mobile distribution platform 10 apply equally well to FIGS. 3A through 3H. Also, it must be understood that FIGS. 3A through 3H set forth such apparatus by way of example and not limitation. Accordingly, alternative numbers of ramps and ramp configurations may be utilized in mobile distribution platform 10 without departing from the spirit and scope of the present invention.

Accordingly, FIG. 3A sets forth a passenger side perspective view of mobile distribution platform 10 in its raised travel configuration. Typically, mobile distribution platform 10 would initially arrive at a chosen site in anticipation of operations having been transported in its raised travel configuration by being towed over conventional roads and highways by a conventional tractor (not shown). As mentioned above, the raised travel configuration of mobile distribution platform 10 is characterized by having all ramps pivoted upwardly to their vertical positions and having all ramps secured by their respective ramp latches 23, 33 and 43 (seen in FIG. 1) As is also shown in FIG. 1. Mobile distribution platform 10 may arrive at a chosen site having one or more pieces of operating equipment supported upon its trailer bed such as loading device 16 (seen in FIG. 1). More specifically, and as is described above, mobile distribution platform 10 includes trailer bed 11, supporting side frames 14 and 15 and top frame 17. As is also described above, trailer bed 11 defines bed surface 12 and tractor coupler 13. Finally, trailer bed 11 supports pivotally attached ramps 20, 30 and 40 attached using the above described hinges.

FIG. 3B sets forth a passenger side perspective view of mobile distribution platform 10 still largely in its raised travel configuration as ramp 30 begins a downward pivotal movement. More specifically, and as is described above, mobile distribution platform 10 includes trailer bed 11, supporting side frames 14 and 15 and top frame 17. As is also described above, trailer bed 11 defines bed surface 12 and tractor coupler 13. Finally, trailer bed 11 supports pivotally attached ramps 20, 30 and 40 attached using the above described hinges. While it will be recognized that a variety of apparatus may be utilized in raising and lowering ramp 30, it has been found advantageous to utilize an electrically powered cable winch 80 secured to trailer bed 11 by conventional attachment (not shown) together with a cable 81. A pulley 82 is secured to the upper member of side frame 15 and/or top frame 17. A portion of cable 81 is wound upon winch 80 and the remaining end of cable 81 is fed through pulley 82 and is attached to the upper surface of ramp 30 by a conventional cable attachment (not shown). As is better seen in FIG. 1, ramp 30 is secured in its raised position by latch 33. Accordingly, ramp 30 is lowered by initially releasing latch 33 (seen in FIG. 1) and powering winch 80 to allow ramp 30 to pivot downwardly under the urging of gravity as shown in FIG. 3B. It will be noted that it has been found expedient to install support jacks 34 through 38 within the sockets (seen in FIG. 8) on the underside of ramp 30 prior to completing the lowering ramp 30 to its fully horizontal position.

FIG. 3C sets forth a passenger side perspective view of mobile distribution platform 10 in its raised travel configuration following the lowering of ramp 30 and the attachment of support jacks 34 through 38. More specifically, and as is described above, mobile distribution platform 10 includes trailer bed 11, supporting side frames 14 and 15 and top frame 17. As is also described above, trailer bed 11 defines bed surface 12 and tractor coupler 13. Finally, trailer bed 11 supports pivotally attached ramps 20, 30 and 40 attached using the above described hinges. Once ramp 30 has been lowered to the horizontal position shown, support jacks 34 through 38 are adjusted in the manner described above in FIG. 2 to level ramp 30 and fully support it upon the underlying surface. Thereafter, attachment 83 is released and cable 81 is wound upon winch 80. Winch 80 may alternatively remain secured to trailer bed 11 or, preferably, be removed and stored.

FIG. 3D sets forth a passenger side perspective view of mobile distribution platform 10 in its raised travel configuration following the lowering of ramp 30 and the attachment of support jacks 34 through 38 and the initial downward pivotal movement of ramp 20 together with the installation of support jacks 24 through 28. More specifically, and as is described above, mobile distribution platform 10 includes trailer bed 11, supporting side frames 14 and 15 and top frame 17. As is also described above, trailer bed 11 defines bed surface 12 and tractor coupler 13. Finally, trailer bed 11 supports pivotally attached ramps 20, 30 and 40 attached using the above described hinges. An electrically powered cable winch 90 is secured to trailer bed 11 by conventional attachment (not shown) together with a cable 91. A pulley 92 is secured to the upper member of side frame 15 and/or top frame 17. A portion of cable 91 is wound upon winch 90 and the remaining end of cable 91 is fed through pulley 92 and is attached to the upper surface of ramp 20 by a conventional cable attachment (not shown). As is better seen in FIG. 1, ramp 20 is secured in its raised position by latch 23. Accordingly, ramp 20 is lowered by initially releasing latch 23 (seen in FIG. 1) and powering winch 90 to allow ramp 20 to pivot downwardly under the urging of gravity as shown in FIG. 3D. It will be noted that it has been found expedient to install support jacks 24 through 28 within the sockets (seen in FIG. 8) on the underside of ramp 20 prior to completely lowering ramp 20 to its fully horizontal position.

FIG. 3E sets forth a passenger side perspective view of mobile distribution platform 10 following the lowering of ramps 30 and 20 as well as the attachment of support jacks 34 through 38 and support jacks 24 through 28. More specifically, and as is described above, mobile distribution platform 10 includes trailer bed 11, supporting side frames 14 and 15 and top frame 17. As is also described above, trailer bed 11 defines bed surface 12 and tractor coupler 13. Finally, trailer bed 11 supports pivotally attached ramps 20, 30 and 40 attached using the above described hinges. Once ramp 20 has been lowered to the horizontal position shown, support jacks 24 through 28 are adjusted in the manner described above in FIG. 2 to level ramp 20 and fully support it upon the underlying surface. Thereafter, attachment 93 is released and cable 91 is wound upon winch 90. Winch 90 may alternatively remain secured to trailer bed 11 or, preferably, be removed and stored.

FIG. 3F sets forth a driver side perspective view of mobile distribution platform 10 following the lowering of ramps 30 and 20 as well as the attachment of support jacks 34 through 38 and support jacks 24 through 28. More specifically, and as is described above, mobile distribution platform 10 includes trailer bed 11, supporting side frames 14 and 15 and top frame 17. As is also described above, trailer bed 11 defines bed surface 12 and tractor coupler 13. Finally, trailer bed 11 supports pivotally attached ramps 20, 30 and 40 attached using the above described hinges.

FIG. 3G sets forth a driver side perspective view of mobile distribution platform 10 following the lowering of ramps 30 and 20 as well as the attachment of support jacks 34 through 38 and support jacks 24 through 28 as ramp 40 begins pivoting to its lowered position and following installation of support jacks 44 through 47. More specifically, and as is described above, mobile distribution platform 10 includes trailer bed 11, supporting side frames 14 and 15 and top frame 17. As is also described above, trailer bed 11 defines bed surface 12 and tractor coupler 13. Finally, trailer bed 11 supports pivotally attached ramps 20, 30 and 40 attached using the above described hinges. An electrically powered cable winch 100 is secured to trailer bed 11 by conventional attachment (not shown) together with a cable 101. A pulley 102 is secured to the upper member of side frame 15 and/or top frame 17. A portion of cable 101 is wound upon winch 100 and the remaining end of cable 101 is fed through pulley 102 and is attached to the upper surface of ramp 40 by a conventional cable attachment (not shown). As is better seen in FIG. 1, ramp 40 is secured in its raised position by latch 43. Accordingly, ramp 40 is lowered by initially releasing latch 43 (seen in FIG. 1) and powering winch 100 to allow ramp 100 to pivot downwardly under the urging of gravity as shown in FIG. 3G. It will be noted that it has been found expedient to install support jacks 44 through 47 within the sockets (seen in FIG. 9) on the underside of ramp 40 prior to completely lowering ramp 42 its fully horizontal position.

Figure 3H:
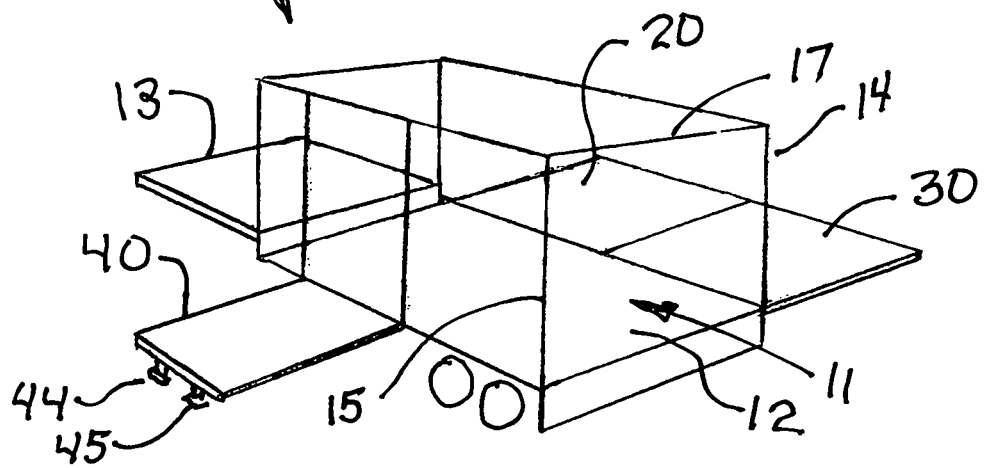

FIG. 3H sets forth a driver side perspective view of mobile distribution platform 10 in its extending loading configuration following the lowering of ramps 20, 30 and 40 as well as the attachment of support jacks 34 through 38, support jacks 24 through 28 and support jacks 44 through 47. More specifically, and as is described above, mobile distribution platform 10 includes trailer bed 11, supporting side frames 14 and 15 and top frame 17. As is also described above, trailer bed 11 defines bed surface 12 and tractor coupler 13. Finally, trailer bed 11 supports pivotally attached ramps 20, 30 and 40 attached using the above described hinges. Once ramp 40 has been lowered to the horizontal position shown, support jacks 44 through 47 are adjusted in the manner described above in FIG. 2 to level ramp 40 and fully support it upon the underlying surface. Thereafter, attachment 103 is released and cable 101 is wound upon winch 100. Winch 100 may alternatively remain secured to trailer bed 11 or, preferably, be removed and stored.

Mobile distribution platform 10 is reconfigured to its raised travel configuration (seen in FIG. 3a) by essentially reversing the above described process as each of ramps 20, 30 and 40 are raised to their vertical positions and secured by latches 23, 33 and 43 respectively. The support jacks are removed from each of ramps 20, 30 and 40 during the raising process and are stored upon trailer bed 11 and preferably secured in place. Similarly, winches 80, 90 and 100 together with their associated cables are removed and similarly stored for travel.

Figure 4:
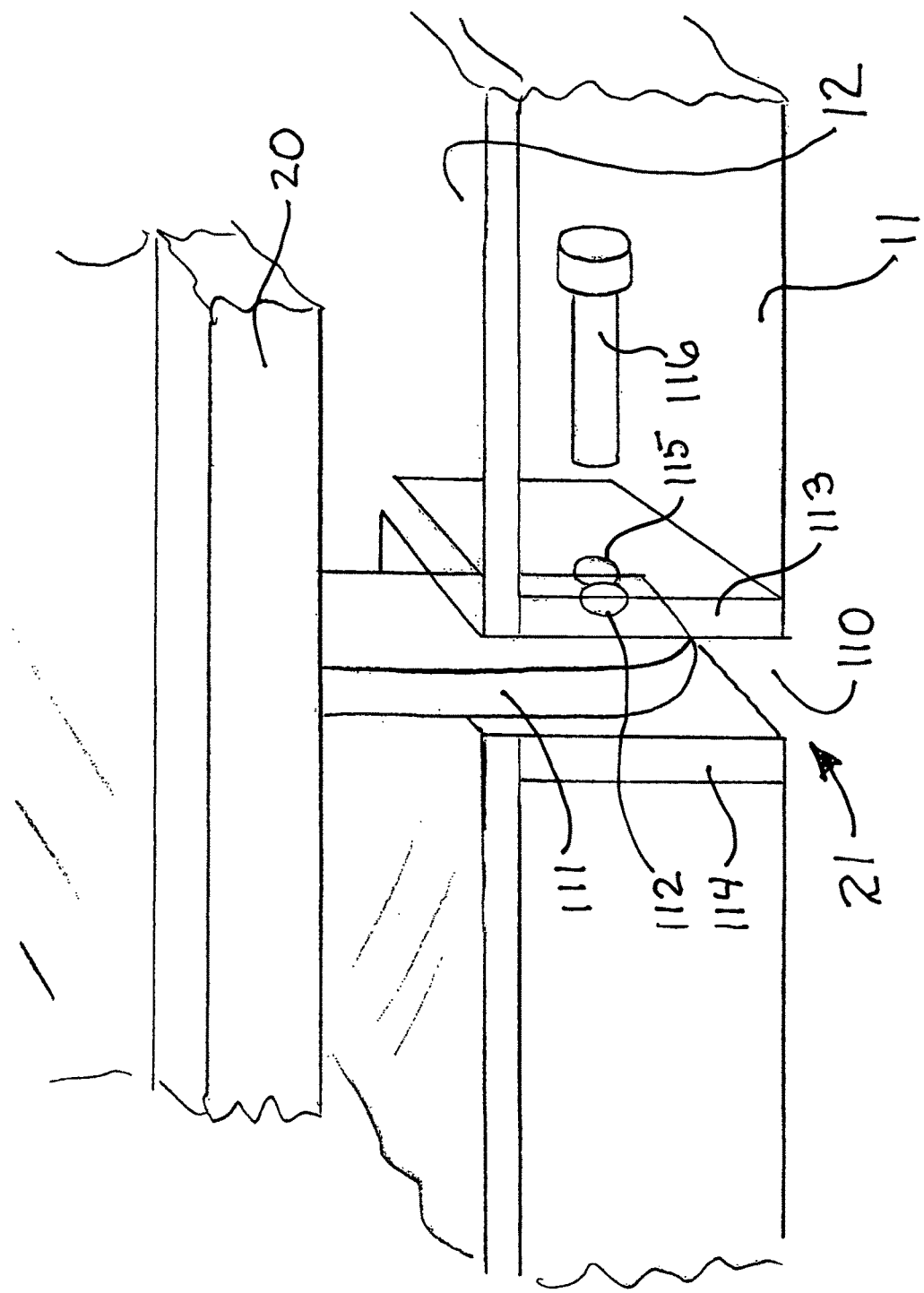
FIG. 4 sets forth a partial perspective view of an illustrative ramp hinge utilized in the present invention mobile distribution platform.

FIG. 4 sets forth a partial perspective view of hinges 21. With temporary return to FIG. 2 it will be recalled that hinges 21 and 22 pivotally secure ramp 22 trailer bed 11 while hinges 31 and 32 secure ramp 30 and hinges 41 and 42 secure ramp 40. Hinges 21 and 22, and hinges 31 and 32 as well as hinges 41 and 42 are potentially identical in fabrication. Accordingly, it will be understood that the description and structure of hinges 21 set forth in FIG. 4 applies equally well to the remaining hinges set forth above. Thus, returning specifically to FIG. 4 trailer bed 11 supporting a bed surface 12 defines a slot 110 extending inwardly from the outer edge there. Slot 110 is defined by adjacent walls 113 and 114. Walls 113 and 114 defined apertures 115 extending their group. Hinges 21 further includes a hinge flange 111 extending downwardly from the underside of ramp 20. Hinge flange 111 defines an aperture 112 which is generally aligned with apertures 115 when ramp 20 is positioned upon trailer bed surface 12. Hinge flange 111 extends into slot 110 and is pivotally secured therein by a hinge pin 116 which is passed through apertures 115 formed in walls 113 and 114 as well as aperture 112 formed in hinge flange 111. Hinge flange 111 is pivotable within slot 110 and provides the hinge attachment for hinge 21.

FIG. 5 sets forth a section view of adjustable support jack 24 which, as is better seen in FIG. 2, is utilized in providing a portion of the support for ramp 20. It will be understood that hinge 24 is substantially identical to support jacks 55 through 58 which support ramp 20, support jacks 34 through 38 which support ramp 30 and support jacks 44 through 47 which support ramp 40. Accordingly, it will be understood that the descriptions and illustrations set forth in FIG. 5 relating to support jack 24 apply equally well to the remaining support jacks utilized in mobile distribution platform 10.

More specifically, support jack 24 includes a frame 130 within which a post 131 is slidably movable. Post 131 supports a base 132 at its lower end and a threaded aperture 133 at its upper end. The upper end of frame 130 is received within a jack socket 124 formed on underside 50 of ramp 20 in the manner shown in FIG. 8. In the preferred fabrication of the present invention jack socket 124, frame 130 and post 131 each define respective square cross-section shapes that facilitate the insertion of the upper end of frame 130 into socket 124 and the sliding movement of post 131 within frame 130. As mentioned above ramp 20 defines a plurality of apertures (seen in FIG. 2) that provide access to the support jacks beneath each ramp by which each support jack is independently adjustable utilizing an adjustment tool which is inserted through each aperture. In the example of support jack 24, socket 124 is aligned with aperture 50 formed in the surface of a ramp 20. A threaded shaft 134 defines a socket end positioned within aperture 54 and a threaded portion 136 which is threadably received within threads 133 of post 131. Socket 124 further defines a flange 51 which in turn defines an aperture 52. Frame 130 supports a flange 139 which defines an aperture (not shown) aligned with aperture 52. A pin 138 passes through the aperture formed in flange 139 and aperture 52 formed in flange 51 to secure support jack 24 within socket 124. Support jack 124 is adjusted by inserting an adjustment tool 135 into the socket end of threaded shaft 134 and rotating threaded shaft 134 to move post 131 into, or outward from, frame 130 as indicated by arrows 53. In this manner, the extension height of support jack 124 is adjusted to level and support ramp 20.

Figure 6:
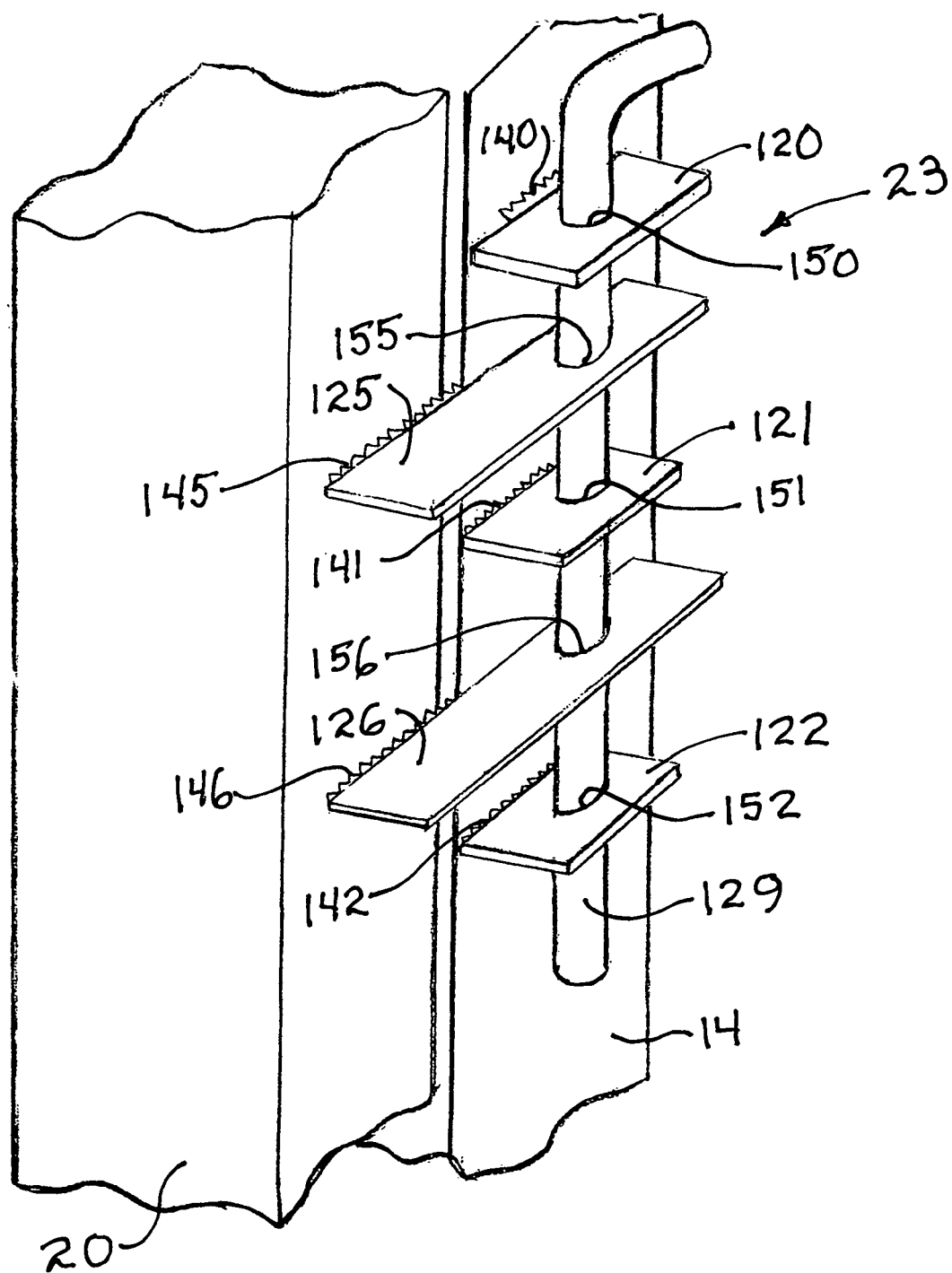
FIG. 6 sets forth a partial perspective view of an illustrative ramp latch utilized in the present invention mobile distribution platform.

FIG. 6 sets forth a perspective view of latch 23 which, as is better seen in FIG. 2, is utilized in securing ramp 20 in its raised vertical position. As is also better seen in FIG. 2, an identical latch 33 is utilized in securing ramp 30 in its raised position while a further identical latch 43 is utilized in securing ramp 40 in its raised configuration. It will be understood that latches 33 and 43 are identical to latch 23 and thus the structure set forth in FIG. 6 and the descriptions accompanying FIG. 6 apply equally well to latches 33 and 43.

Latch 23 is operative to secure a portion of ramp 20 to side frame 14. Latch 23 includes a plurality of flanges 120, 121 and 122 positioned in a generally equally spaced arrangement and secured to side frame 14 by a corresponding plurality of weld attachments 140, 141 and 142. It will be noted that flanges 120, 121 and 122 do not extend beyond side frame 14 and therefore do not interfere with the movements of ramp 20. Conversely, latch 23 also includes a pair of flanges 125 and 126 secured to ramp 20 by a corresponding pair of weld joints 145 and 146. Flanges 125 and 126 extend beyond ramp 20 and overlie a portion of side frame 14. Flanges 120, 121 and 122 defined respective apertures 150, 151 and 152. Similarly, flanges 125 and 126 defined respective apertures 155 and 156. Apertures 150, 151, 152, 155 and 156 are vertically aligned such that an elongated latch pin 129 may be passed through each aperture and thereby secure flanges 120, 121 and 122 to flanges 125 and 126. As a result, latch pin 129 also secures ramp 20 to side frame 14. In the position shown in FIG. 6, latch 23 is secured and ramp 20 is latched in its vertical position. Ramp 20 is lowered by releasing latch 23 through the removal of latch pin 129. It will be apparent to those skilled in the art that the structure of latch 23 set forth in FIG. 6 is provided for purposes of illustration and not limitation. It be further apparent to those skilled in the art that a variety of different latch structures may be utilized within mobile distribution platform 10 for the purpose of securing ramp 20 as well as ramps 30 and 40 (all seen in FIG. 1) in their vertical positions without departing from the spirit and scope of the present invention.

Figure 7A:
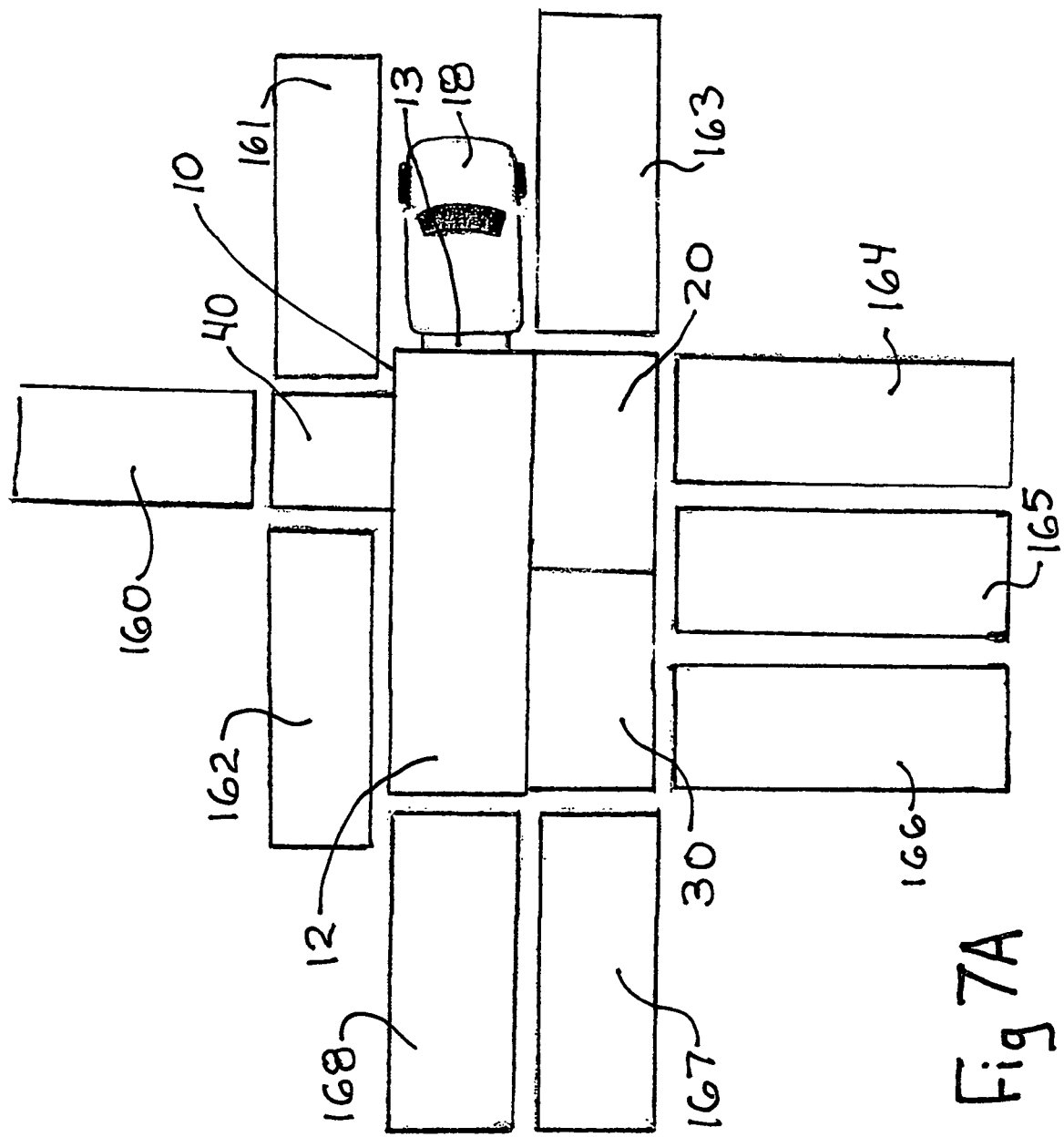
FIG. 7A sets forth a top view of the present invention mobile distribution platform in its open extending loading configuration in combination with illustrative over the road trailers.
Figure 7B:
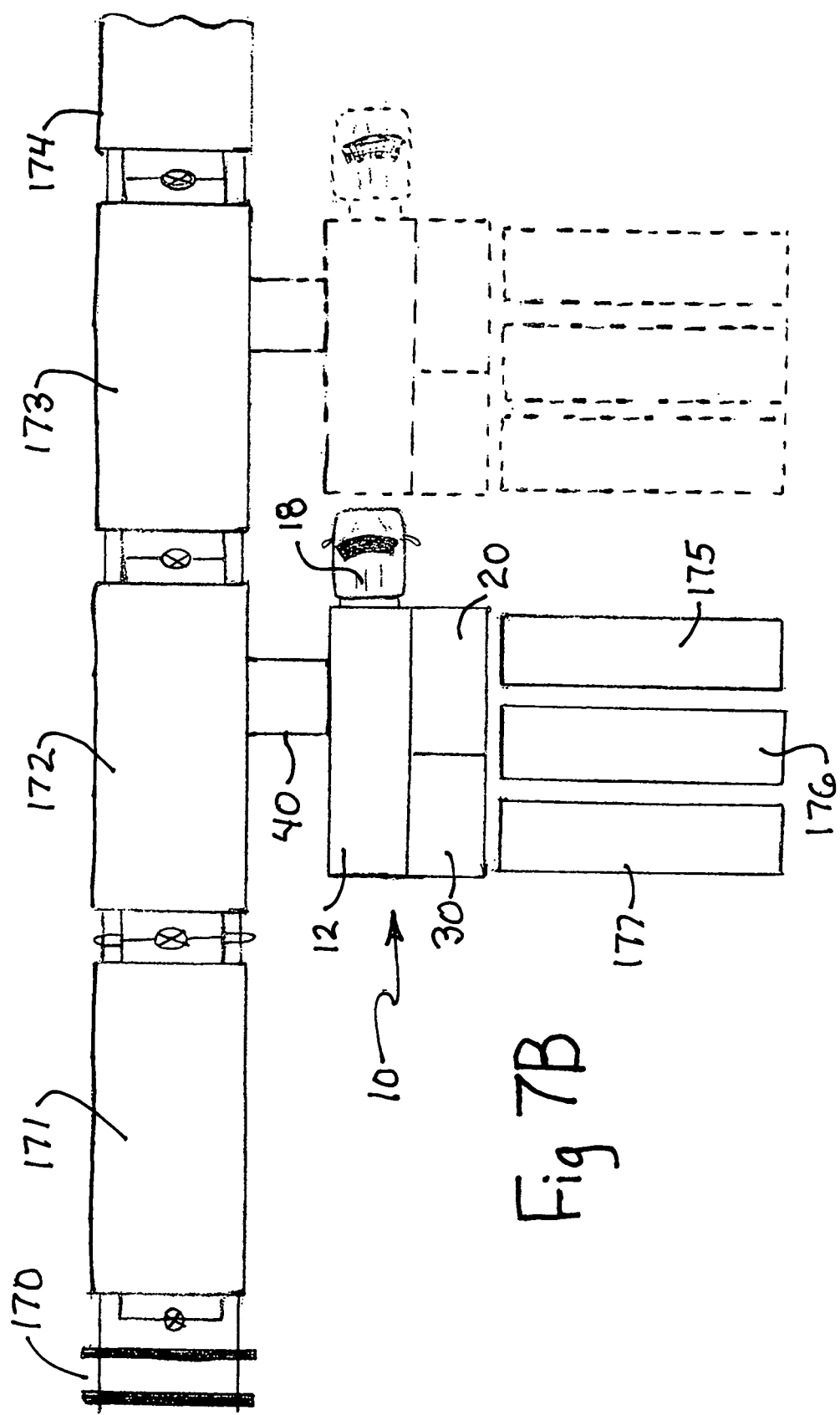
FIG. 7B sets forth a top view of the present invention mobile distribution platform in its open extending loading configuration servicing a plurality of railroad cars.

FIGS. 7A and 7B set forth top views of the present invention mobile distribution plan form utilized in typical environments in which circumstances require the creation of a transportation and distribution "hub" facility to fulfill the above described urgent transportation needs and to provide flexibility within existing transportation and distribution systems. FIG. 7 a shows a typical open area and road accessible location in which the present invention mobile distribution platform is set up to facilitate the transfer of products, commodities and resources from one or more supply trailers to one or more delivery trailers and/or delivery trucks. FIG. 7B shows a typical of the present invention mobile distribution platform in servicing a plurality of railroad supply cars for transfer of products, commodities and resources from the railroad supply cars to a plurality of delivery trailers and/or delivery trucks. It will be recognized that the examples of anticipated use of the present invention mobile distribution platform set forth in FIGS. 7A and 7B describe distribution scenarios in which one or more supply vehicles and/or railroad cars are unloaded and material is transferred therefrom to distribute materials to delivery vehicles. However, it should be realized that the present invention mobile distribution platform performs equally well in a material collecting scenario in which pluralities of supply vehicles are unloaded using the present invention mobile distribution platform and such materials are loaded into larger volume trailers and/or railroad cars for shipment. Thus, it will be understood that the present invention mobile distribution platform functions equally well in distributing materials or collecting and accumulating materials without departing from the spirit and scope of the present invention.

FIG. 7A sets forth a top plan view of mobile distribution platform 10 in a typical open area operational situation in which access is provided to one or more supply trailers and in which material is offloaded to be transferred to one or more distribution trailers or distribution trucks. Accordingly, mobile distribution platform 10 is configured in its extending loading configuration in which ramps 20, 30 and 40 are lowered to the configuration shown in FIG. 2. It would also be assumed in FIG. 7A that the above described process of adjusting the support jacks of each ramp to level and support each ramp has been completed.

As described above, mobile distribution platform 10 includes a trailer bed surface 12 having a plurality of pivotally secured ramps 20, 30 and 40 joined thereto. In the extended configuration shown, ramps 20, 30 and 40 extend outwardly and are generally level and horizontal providing an extended combined platform surface upon which one or more material loaders such as forklift 16 (shown in FIG. 1) are able to move. In the anticipated operation of the present invention mobile distribution platform illustrated in FIG. 7A, a generally flat area such as a large parking lot or unused portion of an airfield or similar paved flat environment is preferred. With mobile distribution platform 10 configured in its extending loading configuration a plurality of "connecting" positions are available for both supply and distribution trailers and/or trucks to access mobile distribution platform 10. By way of example, FIG. 7A shows a plurality of trailer positions 160, 161 and 162 which are backed up to ramp 40. Similarly, a plurality of trailer positions 163, 164 and 165 are shown backed up to ramp 20. Further, a plurality of trailer positions 166, 167 and 168 are shown at positions backed up to ramp 30. In accordance with the flexibility of use provided by mobile distribution platform 10, virtually any combination of supply and distribution trailers and/or distribution trucks may be backed up to mobile distribution platform 10 at the positions shown. Thus, for example, it may be advantageous in some situations to maintain trailer positions 160, 161 and 162 for supply trailers while utilizing trailer positions 163 through 168 for distribution trailers and/or distribution trucks. When used in this manner, equipment operating upon mobile distribution platform 10 is able to generally flow material from positions 160, 161 and 162 using ramp 40 across the combined surfaces of trailer bed surface 12 together with ramps 20 and 30 into positions 163 through 168. It will be apparent however, that other patterns of use may be utilized without departing from the spirit and scope of the present invention. In the preferred application of the present invention mobile distribution platform, ramps 20, 30 and 40 are leveled and height adjusted to align with the interior floors of trailers thereby allowing loading equipment to move directly from the ramp surfaces into the interiors of trailers and/or trucks for maximum efficiency.

FIG. 7B sets forth a top plan view of mobile distribution platform 10 in a typical railroad operational situation in which access is provided to one or more supply railroad cars and in which material is offloaded from the railroad cars to be transferred to one or more distribution trailers or distribution trucks. Accordingly, mobile distribution platform 10 is positioned in proximity to a section of railroad track upon which a plurality of railroad cars 171, 172, 173 and 174 are positioned. Mobile distribution platform 10 is positioned next to a selected railroad car such as railroad car 172. Thereafter, mobile distribution platform 10 is configured in its extending loading configuration in which ramps 20, 30 and 40 are lowered to the configuration shown in FIG. 2 and is positioned such that ramp 40 is aligned with a selected access door of railroad car 172. It would also be assumed in FIG. 7B that the above described process of adjusting the support jacks of each ramp to level and support each ramp has been completed.

As described above, mobile distribution platform 10 includes a trailer bed surface 12 having a plurality of pivotally secured ramps 20, 30 and 40 joined thereto. In the extended configuration shown, ramps 20, 30 and 40 extend outwardly and are generally level and horizontal providing an extended combined platform surface upon which one or more material loaders such as forklift 16 (shown in FIG. 1) are able to move. In the anticipated operation of the present invention mobile distribution platform illustrated in FIG. 7B, a generally flat area alongside railroad track segment 170 which permits mobile distribution platform 10 to be moved alone side railroad track segment 170 is preferred. With mobile distribution platform 10 appropriately positioned with respect to railroad car 172 and configured in its extending loading configuration, a plurality of "connecting" positions are available for distribution trailers and/or trucks to access mobile distribution platform 10. By way of example, FIG. 7B shows a plurality of trailer positions 175, 176 and 177 which are backed up to ramps 20 and 30. In accordance with the flexibility of use provided by mobile distribution platform 10, virtually any alternative combination of distribution trailers and/or distribution trucks may be backed up to mobile distribution platform 10. Thus, for example, it may be advantageous in some situations to maintain trailer positions for distribution trailers and/or distribution trucks that are backed up to ramps 20 or 30 or alternatively backed up to the rear and of trailer bed surface 12. In the anticipated use of mobile distribution platform 10 in the railroad environment shown in FIG. 7B, equipment operating upon mobile distribution platform 10 is able to generally flow material from railroad car 172 using ramp 40 across the combined surfaces of trailer bed surface 12 together with ramps 20 and 30 into positions 175 through 177. It will be apparent however, that other patterns of use may be utilized without departing from the spirit and scope of the present invention.

In the preferred use of the present invention when servicing a plurality of railroad supply cars, tractor 18 remains coupled to mobile distribution platform 10 during the unloading and distribution process. The maintaining of the coupled position of tractor 18 provides a substantial advantage in the operation of the present invention mobile distribution platform in that each railroad car upon track segment 170 may be serviced by mobile distribution platform 10 without requiring the presence of a diesel engine to move the railroad cars into alignment with mobile distribution platform 10 for successive unloading. Instead, mobile distribution platform 10 may be moved from one railroad car to another using tractor 18. In essence, this operation anticipates that once a railroad car has been emptied, platforms 20, 30 and 40 may be raised using the above described apparatus set forth in FIGS. 3A through 3H after which tractor 18 moves mobile distribution platform 10 to the next railroad car position. For purposes of illustration, FIG. 7B shows mobile distribution platform 10 in phantom line depiction having been moved to service railroad car 173. Thus, in accordance with an important advantage of the present invention, mobile distribution platform 10 is able to service a plurality of railroad cars in any selected order without requiring that the railroad cars be moved.

Figure 10:
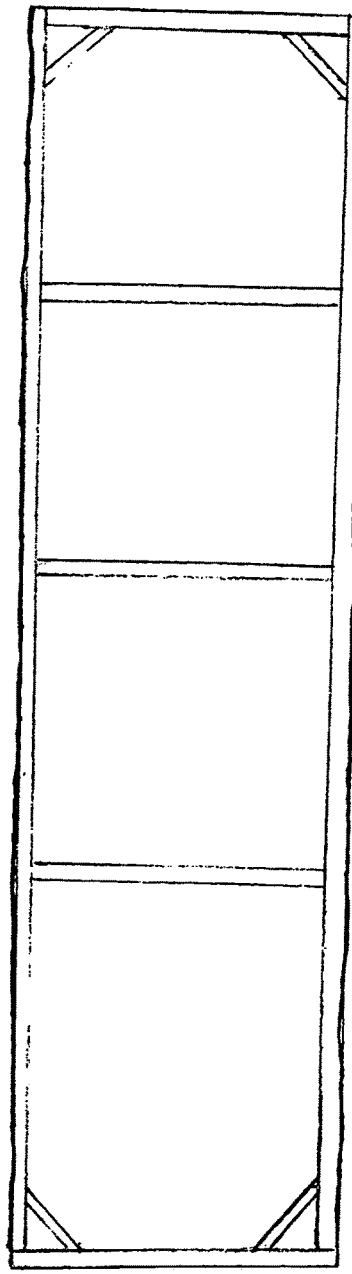
FIG. 10 sets forth a top support frame of the present invention mobile distribution platform.
Figure 11:
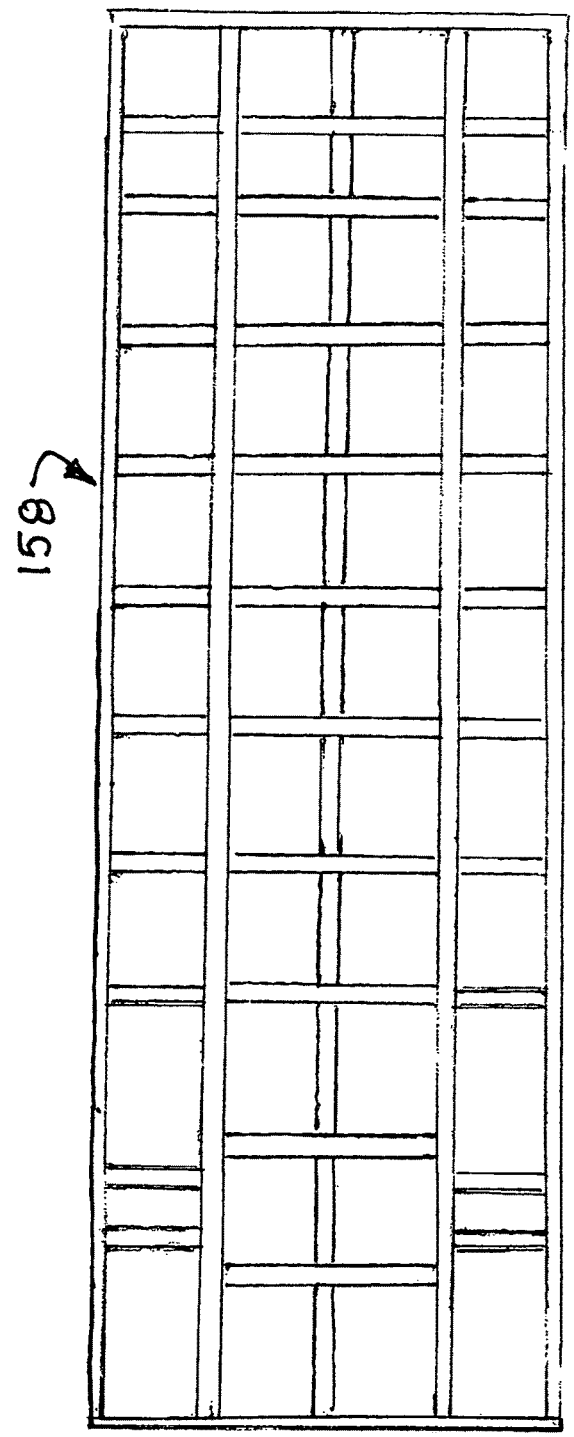
FIG. 11 sets forth a bottom trailer bed support frame of the present invention mobile distribution platform.

FIGS. 8 through 13 set forth the support frames utilized in the above described components which form mobile distribution platform 10. In the preferred fabrication of the present invention, the support frames are fabricated of a high strength material such as steel, or the like, and the attachments between support frames utilize high-strength welding to provide a rigid total structure having suitable strength for the anticipated operations. FIG. 8 sets forth a support frame 148 which is the support frame used for ramps 20 and 30 (seen in FIG. 2). FIG. 9 sets forth a support frame 149 which is the support frame for ramp 40 (seen in FIG. 2). FIG. 10 sets forth a frame 157 which provides top frame 17 (seen in FIG. 2). FIG. 11 sets forth a frame 158 which provides the support frame for trailer bed 12 (seen in FIG. 2). FIG. 12 sets forth a support frame 153 which provides the support frame for side frame 14 (seen in FIG. 2). FIG. 13 sets forth a support frame 154 which provides the support frame for side frame 15 (seen in FIG. 2).

FIGS. 14 and 15 sets forth an alternate embodiment of the present invention mobile distribution platform generally referenced by numeral 180. FIG. 14 sets forth mobile distribution plan form 180 in its raised travel configuration while FIG. 15 sets forth mobile distribution platform 180 in its extending loading configuration.

More specifically, FIG. 14 sets forth a rear view of mobile distribution platform 180 in its raised travel configuration. Mobile distribution platform 180 includes a trailer bed 181 defining a trailer bed surface 182. A pair of ramps 183 and 184 are pivotally secured to trailer bed 181. A pair of ramps 185 and 186 are also pivotally secured to trailer bed 181. A pair of hydraulically powered lift drives 192 and 193 are operatively coupled to ramps 184 and 186 and are supported upon surface 182.

FIG. 15 sets forth mobile distribution platform 180 in its extending loading configuration. As is described above, mobile distribution platform 180 includes trailer bed 181 having trailer bed surface 182. As is also described above, mobile distribution platform 180 includes ramps 183, 184, 185 and 186. Ramp 183 is pivotally joined to trailer bed 181 by a pair of hinges 175 and 176. Ramp 184 is pivotally joined to trailer bed 181 by a pair of hinges 177 and 178. Ramp 185 is pivotally joined to trailer bed 181 by a pair of hinges 188 and 189. Ramp 186 is pivotally joined to trailer bed 181 by a pair of hinges 190 and 191. Hinges 175 through 178 and hinges 188 through 191 are fabricated in the manner set forth above in FIG. 4. Alternatively, a conventional hinge may be utilized.

FIGS. 16A through 16D, taken together, set forth operational flow diagrams of the present invention method of providing and utilizing a mobile distribution platform. The inventive method greatly increases the flexibility of a distribution system by providing the capability of employing one or more mobile distribution platforms strategically located throughout a distribution system to meet unforeseen and urgent needs for the transportation and distribution of products, commodities and resources by establishing one or more distribution hubs. The inventive method meets urgent requirements, increases flexibility and avoids bottlenecks which would otherwise develop in more conventional distribution systems.

Figure 16B:
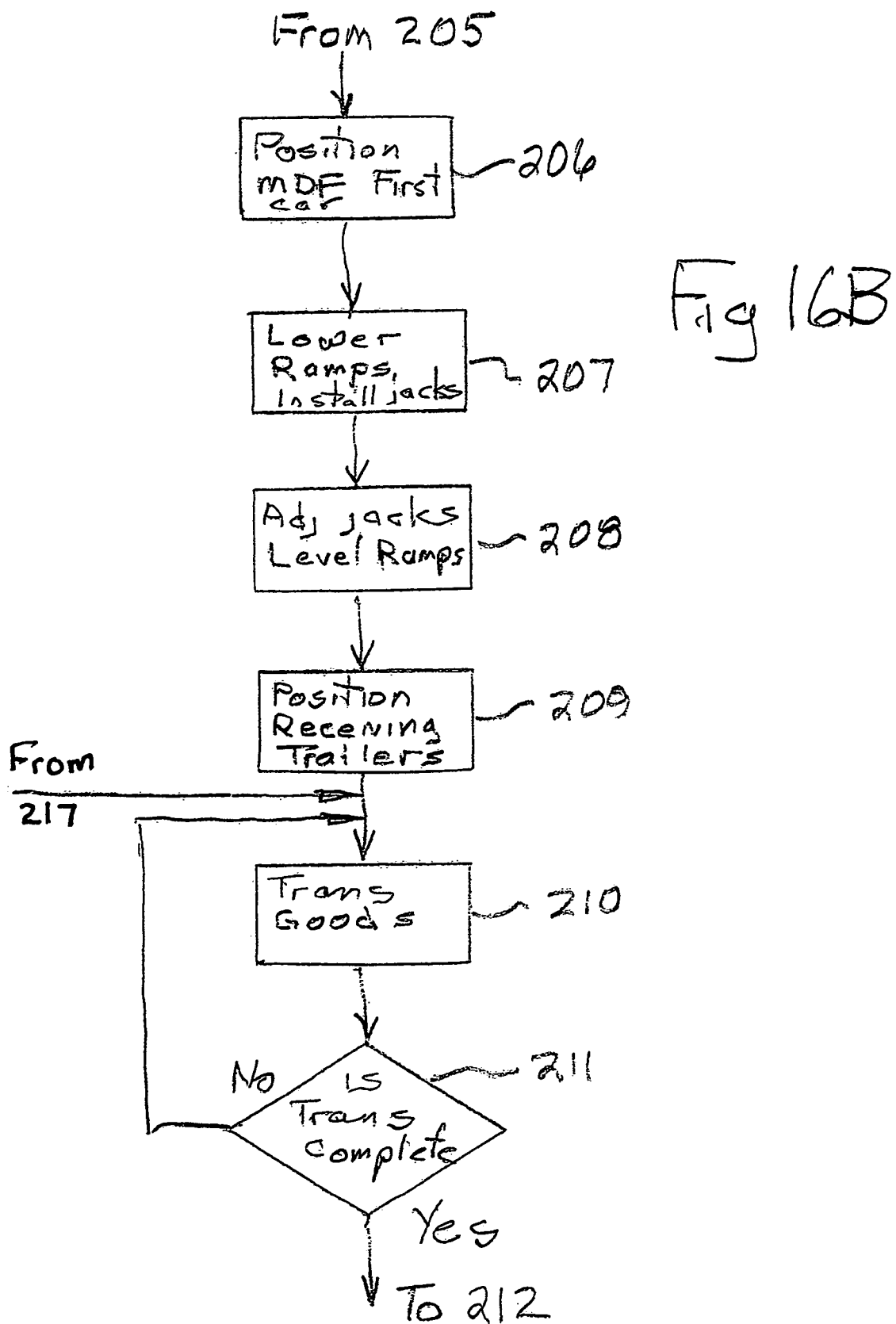

FIG. 16A sets forth a portion of a flow diagram illustrating the present invention method generally referenced by numeral 200. Method 200 begins initially at a step 201 in which there is provided a mobile distribution platform capable of being transported by a conventional tractor over existing roads to a desired site. The mobile distribution platform is configurable in a closed travel configuration and is alternatively configurable in an extending loading configuration in which it serves as a transportation hub to increase the flow of products, commodities and resources. At step 202 a hub site is selected which will benefit from the transportation and distribution capabilities of the mobile distribution platform to enhance the flow of products, commodities and resources. At step 203 the mobile distribution platform is configured in its raised travel configuration. At step 204 the configured mobile distribution platform is transported over conventional roads to the selected site. At step 205 a determination is made as to whether the selected site utilizes railroad supply apparatus. In the event a determination is made at step 205 that the mobile distribution platform is to be operated in association with railroad supply apparatus, the system moves to step 206 (seen in FIG. 16B) in which the mobile distribution platform is positioned in alignment with the first railroad car to be serviced.

Continuing in FIG. 16B in a typical operation utilizing the present invention mobile distribution platform in association with railroad apply apparatus, a portion of railroad track supports a plurality of railroad cars each loaded with the products, commodities and resources which are to be distributed. In accordance with an important advantage of the present invention method, the mobile distribution platform is able to move into alignment with successive railroad cars without the need of moving the railroad cars themselves. Thus, at step 206 the mobile distribution platform is positioned in alignment with the first railroad car which is to be serviced. At steps 207 and 208 the mobile distribution platform is reconfigured from its travel configuration to its extending loading configuration by lowering the ramps of the mobile distribution platform and installing a plurality of adjustable support jacks at step 207 and at step 208 adjusting each support jack to level and firmly support the ramps.

At step 209 a plurality of product receiving trailers and/or product receiving trucks are positioned in proximity to the ramps of the mobile distribution platform. At step 210 equipment such as forklift material handlers, and the like, are operated upon the mobile distribution platform to transfer the products, commodities and resources from the railroad apply cars to the receiving trailers and/or receiving trucks. At step 211 a determination is made as to whether the transfer of material has been completed. If it is determined that the transfer of material is not yet completed, the system returns to step 210 and continues to transfer goods until the transfer is determined at step 211 to be complete. Once the transfer of materials from the railroad car is complete the system moves to step 212 seen in FIG. 16C.

Figure 16C:
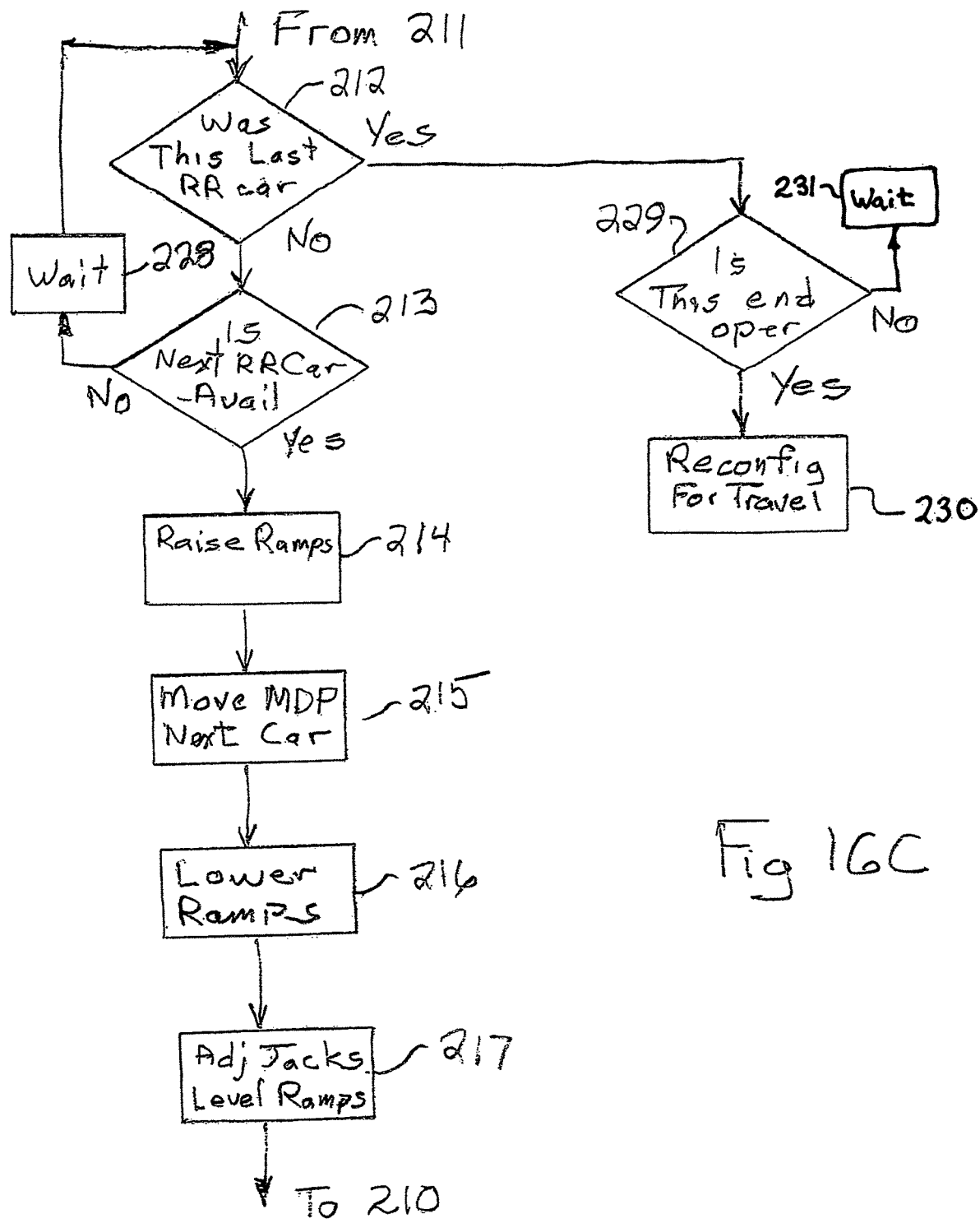

Continuing in FIG. 16C, at step 212 a determination is made as to whether the unloaded railroad car was the last available railroad car. If a determination is made that the serviced railroad car was the last available railroad car, the system moves to step 229 at which a determination is made as to whether the operation is at end. If the operation is determined to be completed at step 229, the system moves to step 230 at which the mobile distribution platform is reconfigured to its raised travel configuration in preparation for transport to a further site. If, however, a determination is made at step 229 that the operation is not at end, the system moves to step 231 and waits for the next available railroad car.

If a determination is made at step 212 that the serviced railroad car was not the last available railroad car the system moves to a step 213 at which a determination is made as to whether the next railroad car is available for unloading. In the event the next railroad car is not yet available the system waits at step 228 until the car is available and then returns to step 212 if however a determination is made at step 213 that the next railroad car is available the system moves to step 214 at which the ramps of the mobile distribution platform are raised after which the system moves to step 215 at which the mobile distribution platform is moved into alignment with the next railroad car in the line of railroad cars upon the track. It will be noted that in accordance with an important aspect of the present invention, the present invention method does not require the use of a railroad diesel engine to move each railroad car into alignment with the mobile distribution platform but rather moves the mobile distribution platform into alignment with successive railroad cars. This greatly enhances the efficiency of the present invention method.

At step 216 the ramps of the mobile distribution platform are again lowered and at step 217 the support jacks are adjusted to level and support the ramps in preparation for continuing use. Once the support jacks supporting each ramp have been properly adjusted, the system returns to step 210 at which the transfer of material from the railroad car is undertaken.

Figure 16D:
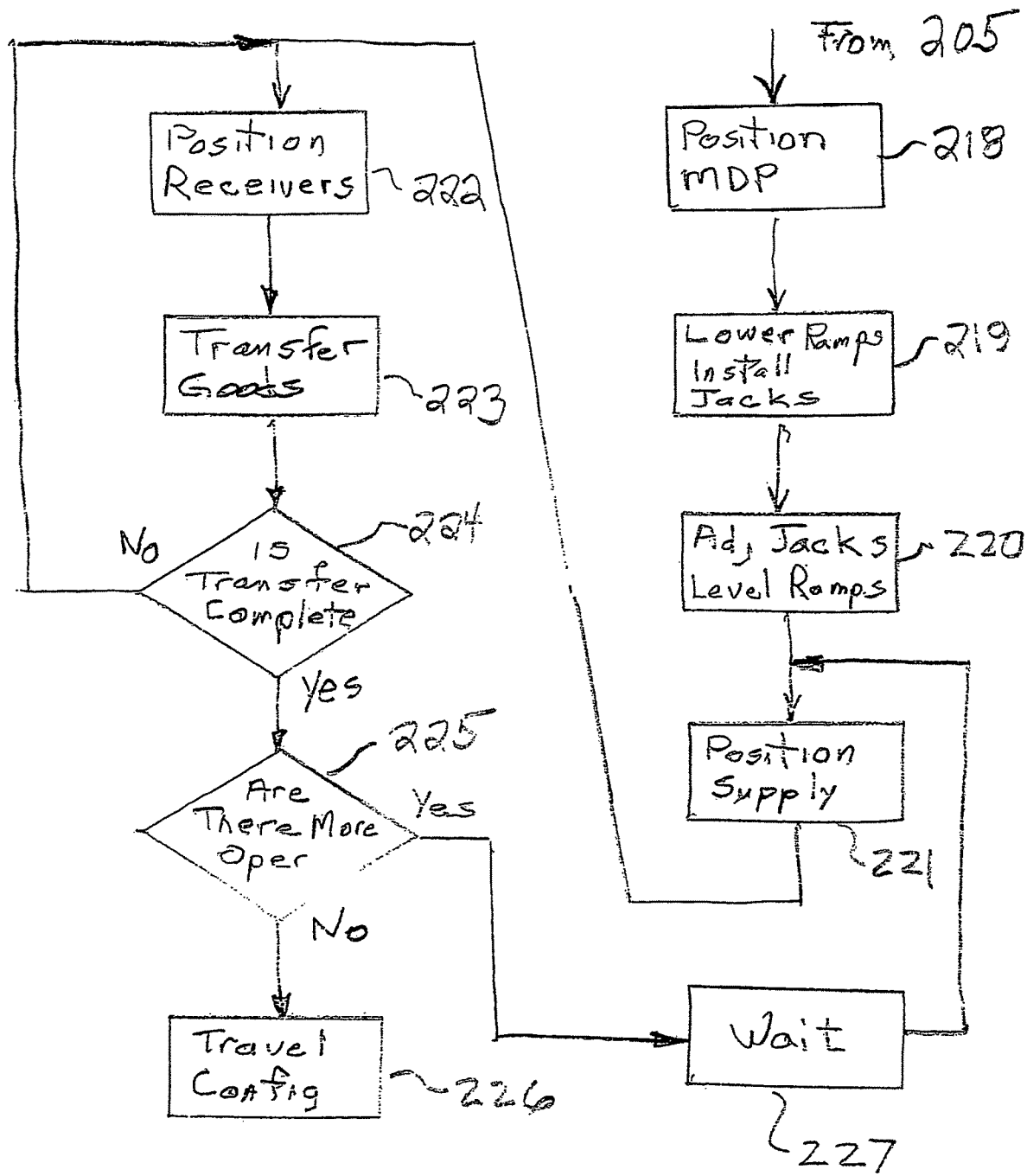

Returning to FIG. 16A, if a determination is made at step 205 that the selected site of operation is not associated with railroad supply apparatus, the system moves to step 218 (seen in FIG. 16D). It is anticipated that a selected site which is not in association with railroad supply apparatus will instead be a site which has access to road transportation such that a plurality of over the road supply tractor and trailer rigs will have access to bring in products, commodities and resources which are to be further distributed using the present invention mobile distribution platform.

In FIG. 16D the system moves from step 205 (seen in FIG. 16A) to a step 218 at which the mobile distribution platform is positioned within the chosen site at a location accessible to over the road tractor trailer supply apparatus. At step 219 the ramps of the mobile distribution platform are lowered and the support jacks are installed. At step 220 the support jacks are adjusted to level and stabilize the ramps of the mobile distribution platform. At step 221 a plurality of supply trailers are positioned with respect to one or more of the ramps of the mobile distribution platform. At step 222 a plurality of receiving trailers and/or trucks are positioned in proximity to the mobile distribution platform ramps after which at step 223 materials are transferred from the supply trailers to the receiving trailers and/or trucks.

At step 224 a determination is made as to whether the transfer of products, commodities and resources from the supply trailers to the receiving trailers and/or receiving trucks is complete. In the event transfer is complete, the system determines at step 225 whether there are more operations to be carried forward at this site. If no further operations are to be carried forward at this site, the system moves to a step 226 at which the mobile distribution platform is again reconfigured to its raised travel configuration to facilitate transport to a different site. If, however, a determination is made at step 225 that other operations are to be carried forward the system moves to a step 227 where it waits for the next operation. Thereafter, the system returns to step 221. If at step 224 a determination is made that the transfer of materials from the supply trailers to the receiving trailers and/or receiving trucks is not complete the system returns to step 222 and continues therefrom moving through steps 222 and 223 until a determination is made at step 224 that the material transfer is complete.

Figure 17:
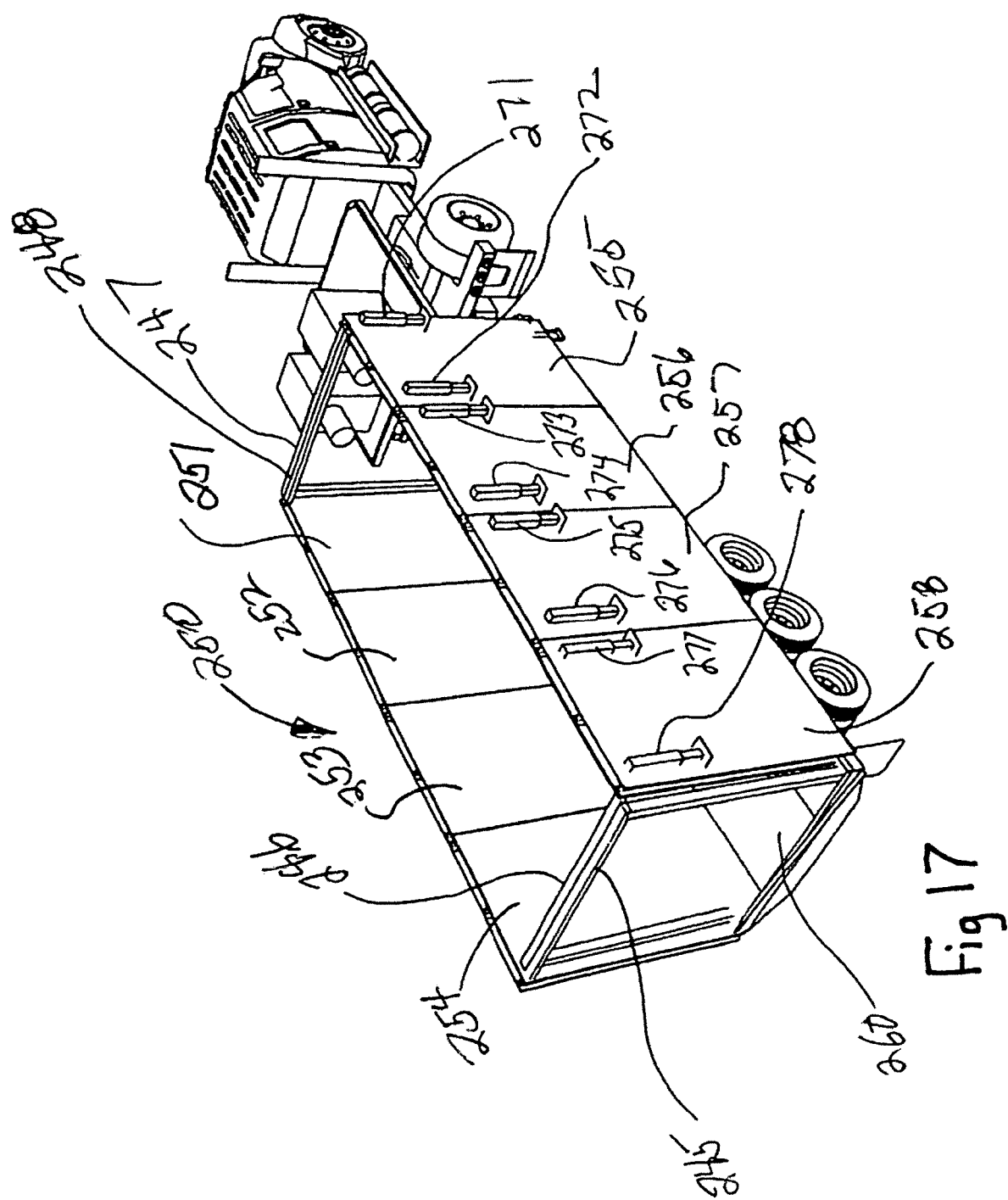
FIG. 17 sets forth a perspective view of a further alternate embodiment of the present invention mobile distribution platform in its closed traveling configuration.
Figure 18:
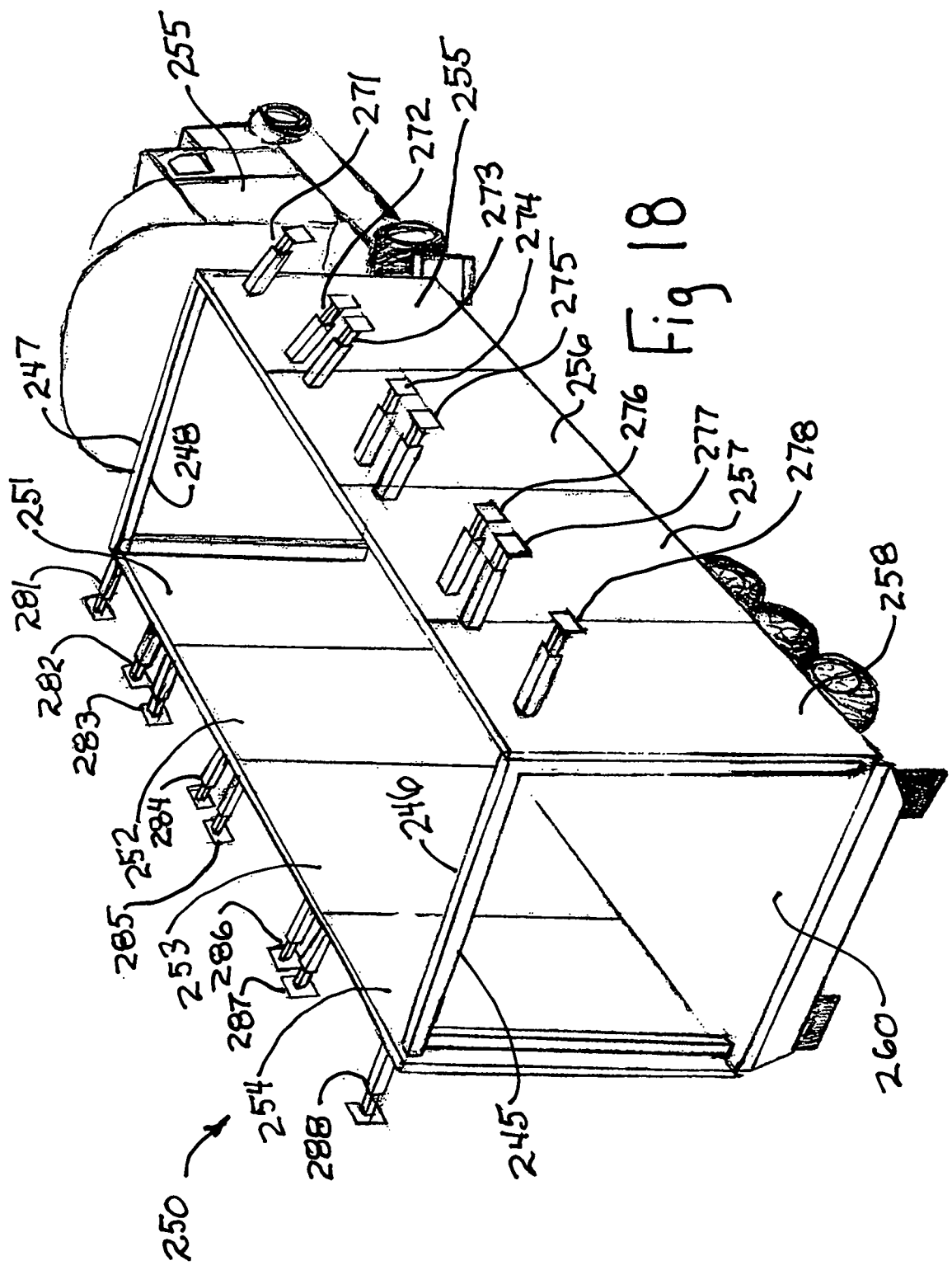
FIG. 18 sets forth a perspective view of the further alternate embodiment of the present invention mobile distribution platform shown in FIG. 17 beginning a transition to its open configuration.
Figure 19:
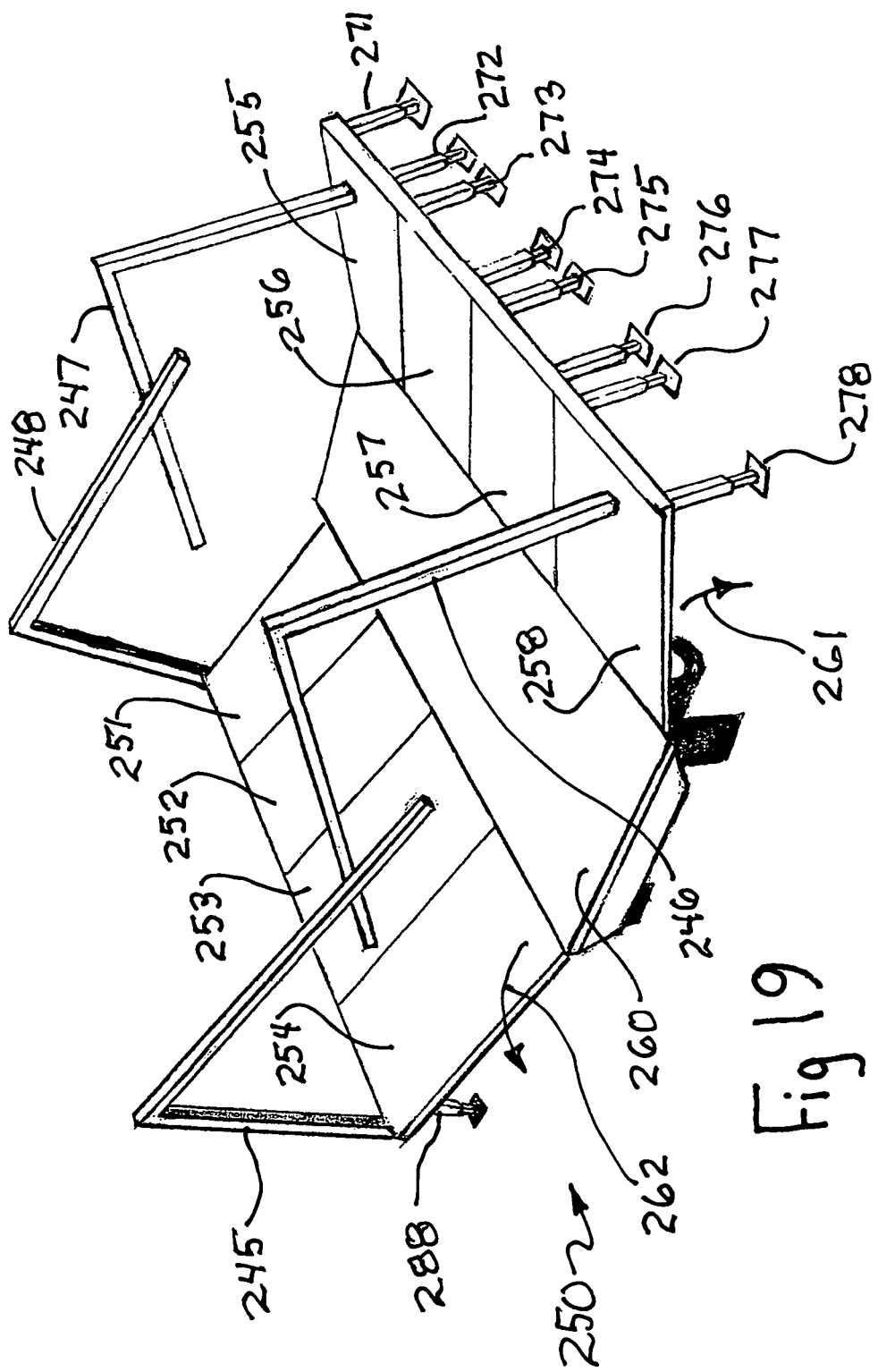
FIG. 19 sets forth a perspective view of the further alternate embodiment of the present invention mobile distribution platform shown in FIG. 17 intermediate in its transition to its open configuration.
Figure 20:
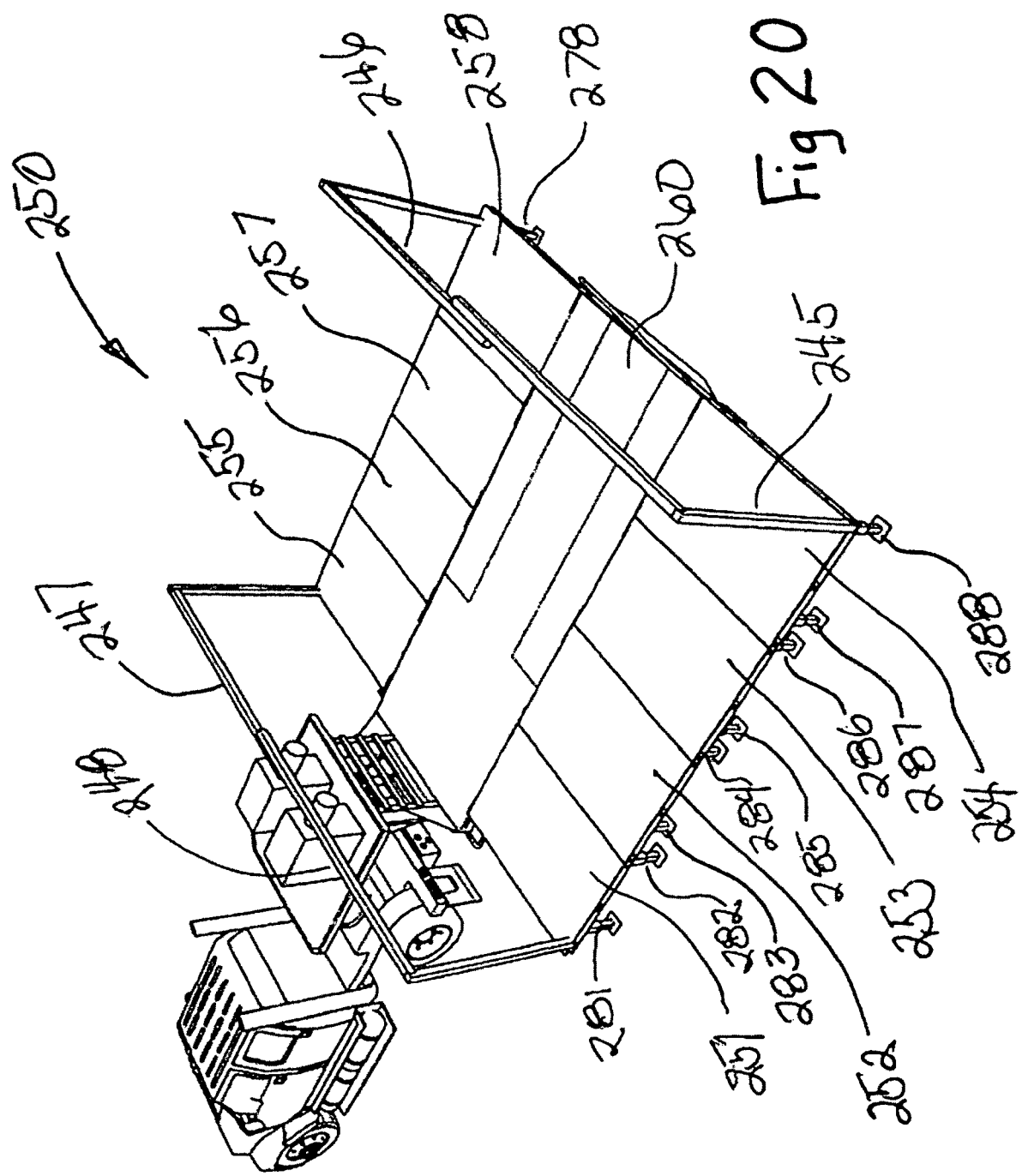
FIG. 20 sets forth a perspective view of the further alternate embodiment of the present invention mobile distribution platform shown in FIG. 17 in its open configuration.

FIGS. 17, 18, 19 and 20 set forth sequential perspective views of a further alternate embodiment of the present invention mobile distribution platform generally referenced by numeral 250 illustrating the transition of mobile distribution platform 250 from a closed traveling configuration shown in FIG. 17 to an open loading/unloading configuration shown in FIG. 20.

With concurrent reference to FIGS. 17 through 20, mobile distribution platform 250 includes a trailer bed 260 configured to be moved as an over the road trailer when pulled by a conventional tractor. A plurality of generally flat planar ramps 251, 252, 253 and 254 are pivotally supported along the left edge of trailer bed 260 by conventional hinges such as those set forth and described above. Similarly, a plurality of generally flat planar ramps 255, 256, 257 and 258 are pivotally supported along the right edge of trailer bed 260 by a second plurality of hinges (not shown). In accordance with the preferred fabrication of the present invention, each of ramps 251 through 258 supports a pair of pivotally mounted support jacks in the manner set forth below in FIGS. 33A and 33B. As is best seen in FIG. 17, support jacks 271 and 272 are secured to ramp 255 while support jacks 273 and 274 are pivotally secured to ramp 256. Similarly, support jacks 275 and 276 are pivotally secured to ramp 257 while support jacks 277 and 278 are pivotally secured to ramp 258. In a similar manner and as is better seen in FIG. 18, support jacks 281 and 282 are pivotally secured to ramp 251 while support jacks 282 and 283 are pivotally secured to ramp 252. Similarly, support jacks 285 and 286 are pivotally secured to ramp 253 while support jacks 287 and 288 are pivotally secured to ramp 254. A pair of right angle frames 245 and 246 are supported upon ramps 254 and 258 respectively. Similarly, a pair of right angled frames 247 and 248 are supported upon ramps 255 and 251 respectively.

FIG. 17 sets forth mobile distribution platform 250 in its closed traveling configuration. In this configuration, ramps 251 through 258 are raised about their respective hinges in the manner described above and secured by a plurality of latches (not shown) also in the manner described above. Frames 245 and 246 assume the positions shown in FIG. 17 as do frames 247 and 248. In this closed or traveling configuration, support jacks 271 through 278 are pivoted to their positions against the underlying surfaces of ramps 255 through 258 respectively. While not visible in FIG. 17 it will be understood that support jacks 281 through 288 are similarly pivoted to positions against ramps 251 through 254 in the same manner. Thus, with mobile distribution platform 250 configured in this manner, a conventional tractor is able to move mobile distribution platform 250 over the road to a desired location. Once the desired location has been reached, and in accordance with an important aspect of the present invention, mobile distribution platform 250 may then be positioned at the required location and reconfigured to the operational open configuration shown in FIG. 20.

FIG. 18 sets forth a perspective view of mobile distribution platform 250 beginning a transition from the closed configuration shown in FIG. 17 to its open configuration shown in FIG. 20. In this initial step, support jacks 271 through 278 and 281 through 288 have been pivoted away from their respective ramps to their support positions in anticipation of pivoting the ramps downwardly in the manner shown in FIG. 19.

FIG. 19 sets forth a perspective view of mobile distribution platform 250 intermediate in its transition to its open configuration. As can be seen, ramps 251 through 254 pivoted downwardly in the direction indicated by arrow 262 while ramps 255 through 258 pivoted downwardly in the direction indicated by arrow 261. Once the ramps approach a horizontal orientation, the respective pairs of support jacks for each ramp will contact the underlying surface and complete the support of the ramps.

FIG. 20 sets forth a perspective view of mobile distribution platform 250 in its open configuration. In this configuration each of support jacks 271 through 278 and 281 through 288 are adjusted to level and support ramps 251 through 258 which then in combination with trailer bed 260 provide a generally flat loading and unloading surface upon which goods may be moved in the manner described above. Once the desired work is complete the sequence of configuration is carried forward in reverse to again configure mobile distribution platform 250 in its traveling closed configuration for transport to another site.

Figure 21:
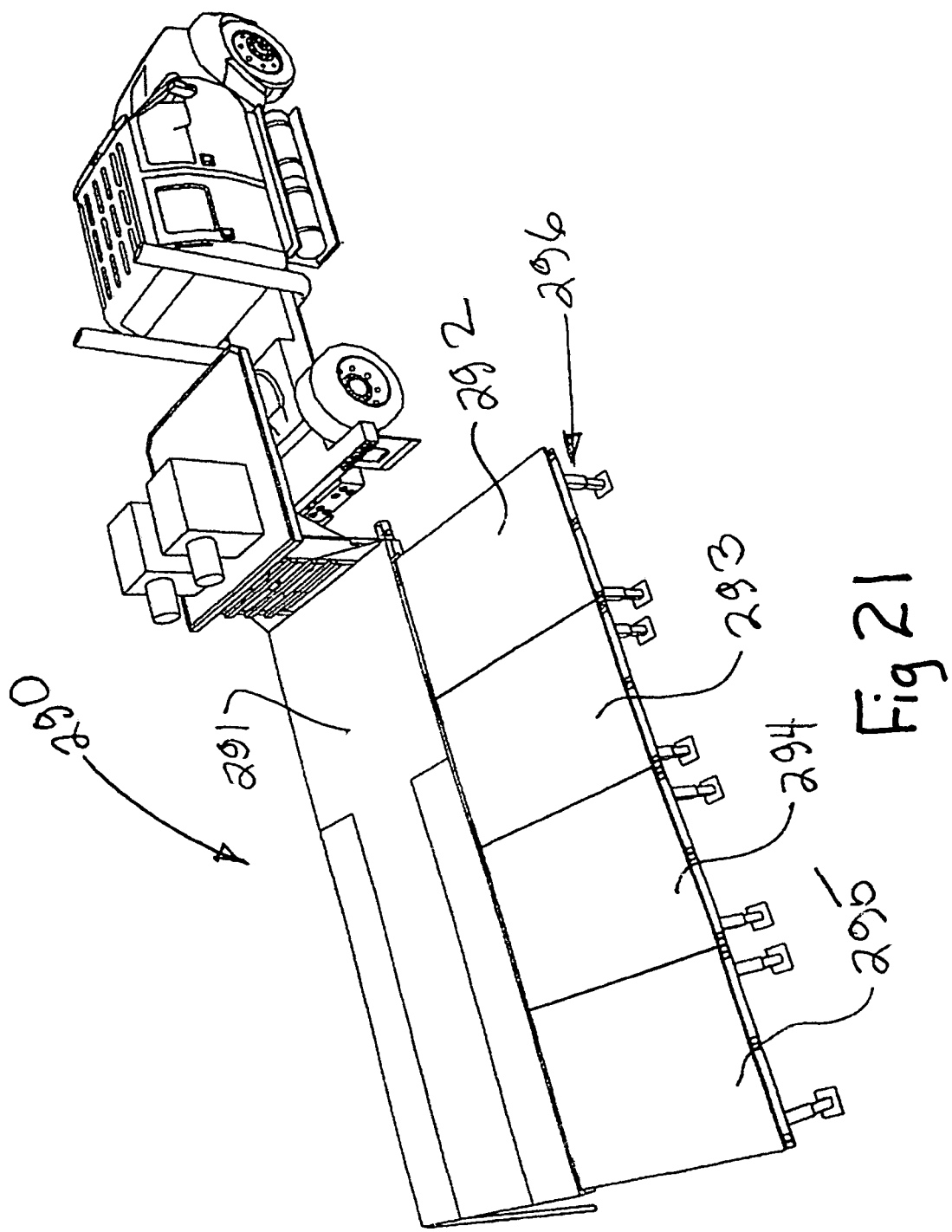
FIG. 21 sets forth a perspective view of a still further alternate embodiment of the present invention mobile distribution platform in its open loading/unloading configuration.

FIG. 21 sets forth a perspective view of a still further alternate embodiment of the present invention mobile distribution platform generally referenced by numeral 290 in its open loading/unloading configuration. Mobile distribution platform 290 represents an example of a "one-sided" embodiment of the present invention in which ramps are secured to one side of the trailer bed leaving the remaining side of the trailer bed on altered. Specifically, mobile distribution platform 290 includes a trailer bed 291 having a plurality of ramps 292 through 295 pivotally secured along one edge thereof. Ramps 292 through 295 are supported by a plurality of support jacks 296 in the manner described above.

Figure 22:
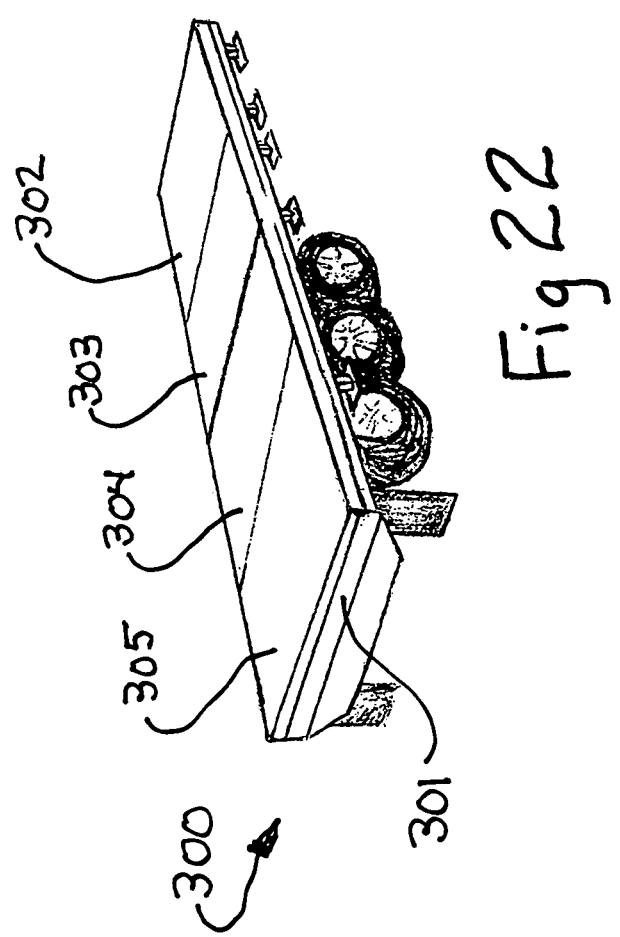
FIG. 22 sets forth a perspective view of a still further alternate embodiment of the present invention mobile distribution platform in its closed configuration.
Figure 23:
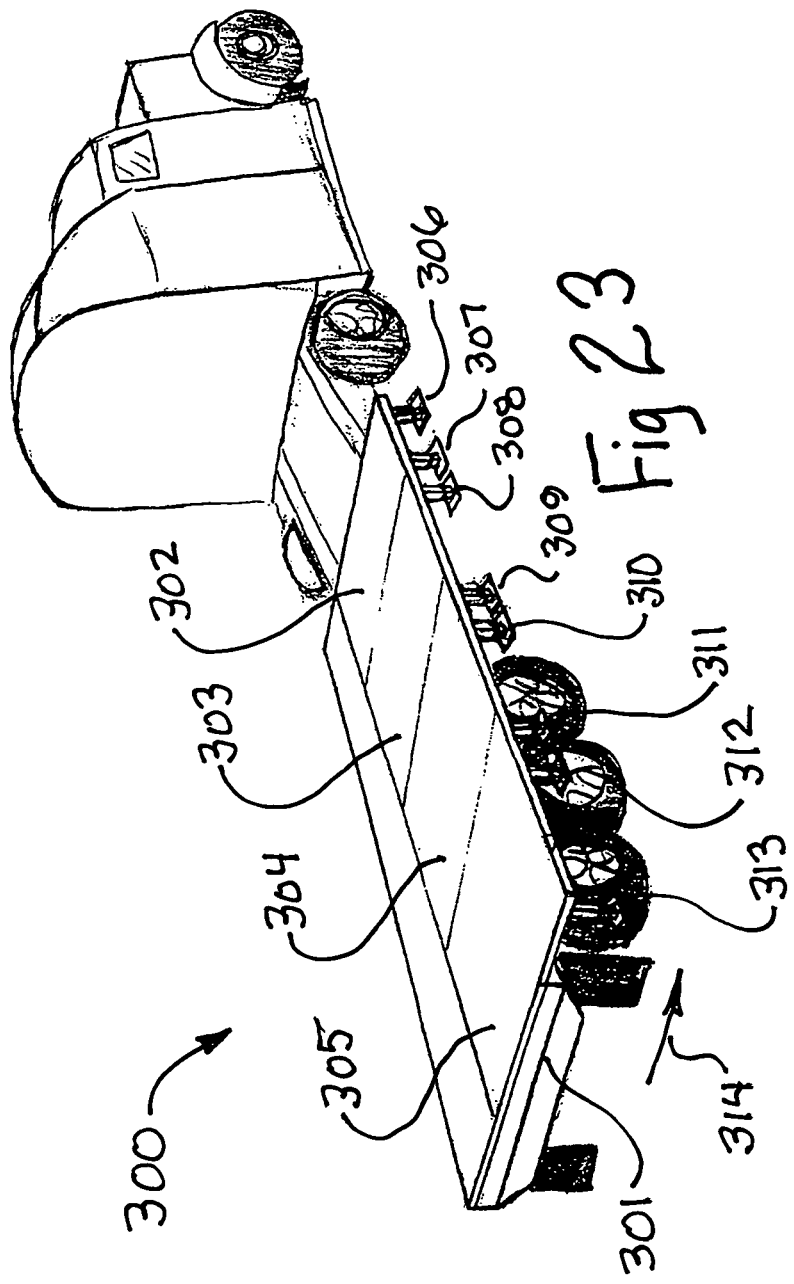
FIG. 23 sets forth a perspective view of the still further alternate embodiment of the present invention mobile distribution platform shown in FIG. 22 beginning a transition to its open configuration.
Figure 24:
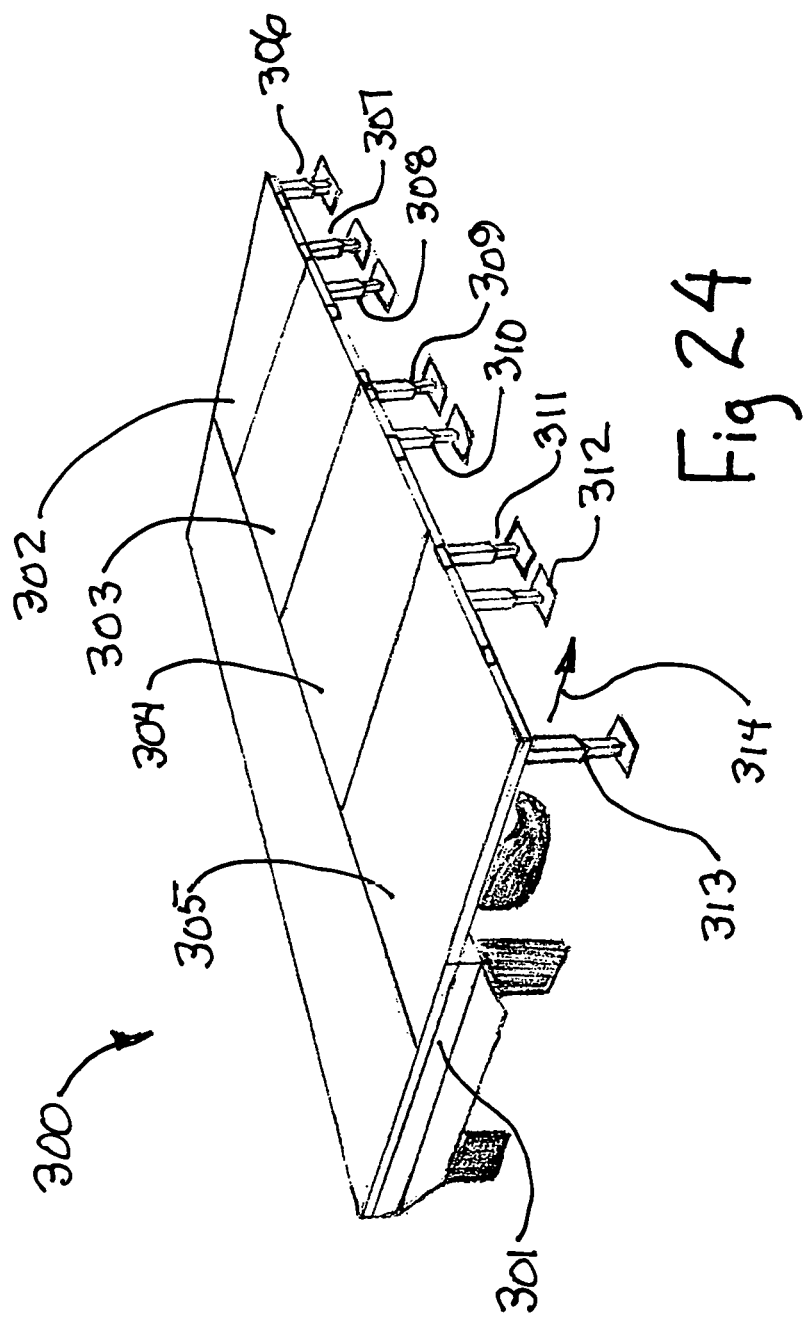
FIG. 24 sets forth a perspective view of the still further alternate embodiment of the present invention mobile distribution platform shown in FIG. 22 continuing in a transition to its open configuration.
Figure 25:
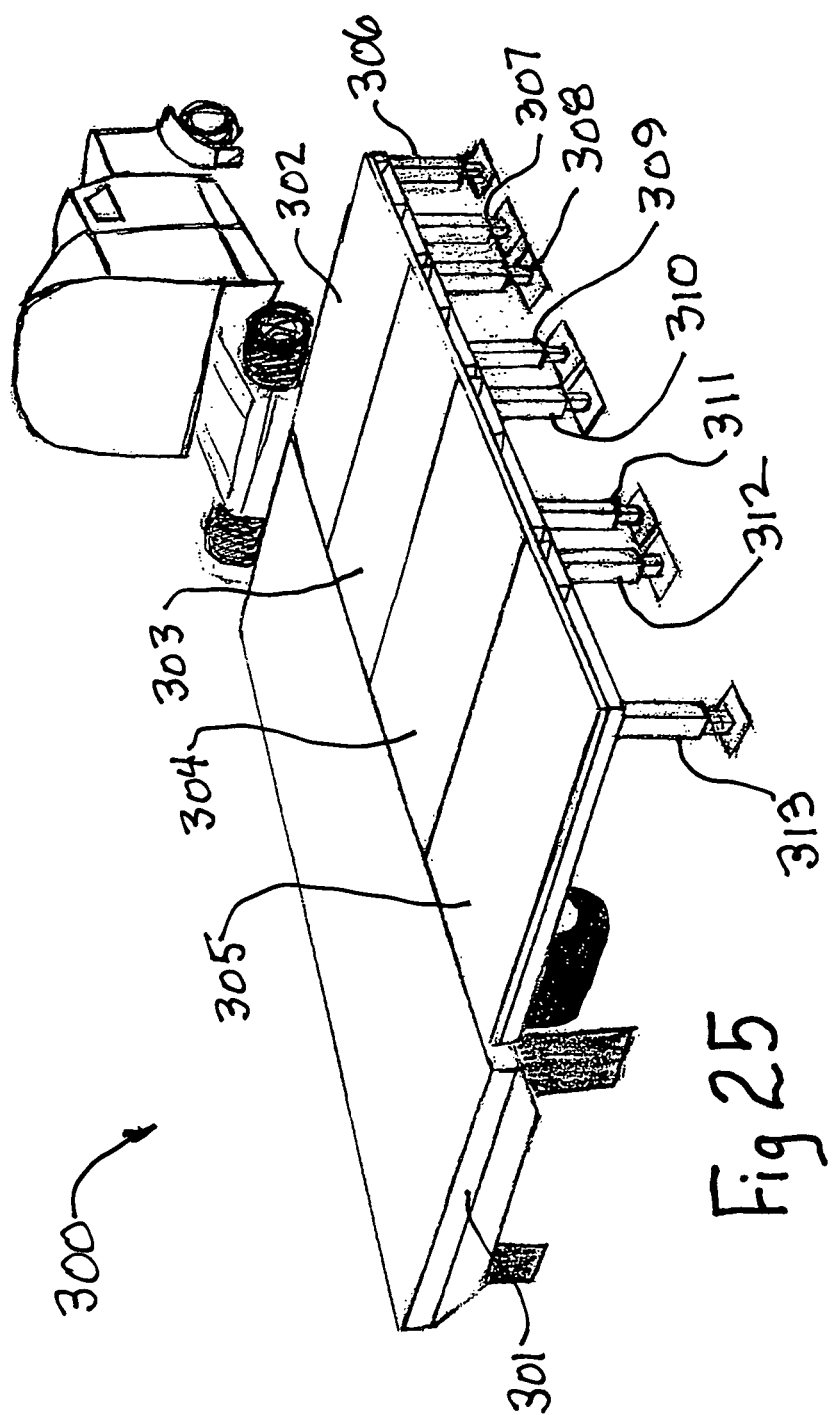
FIG. 25 sets forth a perspective view of the still further alternate embodiment of the present invention mobile distribution platform shown in FIG. 22 its pen configuration.

FIGS. 22, 23, 24 and 25 set forth sequential perspective views of a further alternate embodiment of the present invention mobile distribution platform generally referenced by numeral 300 illustrating the transition of mobile distribution platform 300 from a closed traveling configuration shown in FIG. 22 to an open loading/unloading configuration shown in FIG. 25. Mobile distribution platform 300 differs from the remaining embodiments set forth herein in that the plurality of ramps are slidably supported upon the trailer bed rather than pivotally supported upon hinges.

With concurrent reference to FIGS. 22, 23, 24 and 25, mobile distribution platform 300 includes a generally flat trailer bed 301 configured to be moved over the road by a conventional tractor. A plurality of generally planar ramps 302, 303, 304 and 305 are supported upon trailer bed 301 in a sliding attachment utilizing conventional rail engagements, or the like, (not shown). Ramp 302 supports a pair of the support jacks 306 and 307 while ramp 303 supports a pair of support jacks 308 and 309. Similarly, ramp 304 supports a pair of support jacks 310 and 311 while ramp 305 supports a pair of support jacks 312 and 313. Support jacks 306 through 313 may be fabricated in the manner set forth above in FIG. 5 or, alternatively, in the manner set forth below in FIGS. 33A and 33B.

FIG. 22 sets forth a perspective view of mobile distribution platform 300 in its closed configuration suitable for over the road travel. In this position ramps 302 to 305 are fully supported upon trailer bed 301.

FIG. 23 sets forth a perspective view of mobile distribution platform 300 beginning a transition to its open configuration. This transition begins as ramps 302 through 305 are slidably moved upon trailer bed 301 in the direction indicated by arrow 314. Correspondingly, support jacks 306 through 313 begin moving from their storage positions to their support positions.

FIG. 24 sets forth a perspective view of mobile distribution platform 300 continuing in a transition to its open configuration. This transition is apparent as ramps 302 through 305 continue moving in the direction indicated by 314 away from their positions overlying trailer bed 301. Concurrently, support jacks 306 through 313 move further downwardly toward their support positions.

FIG. 25 sets forth a perspective view of mobile distribution platform 300 in its open configuration. In this configuration, ramps 302 through 305 have moved from trailer bed 301 and remain secured thereto along their respective contacting edges. Support jacks 306 through 313 have extended downwardly and now occupy their full support positions.

Figure 26:
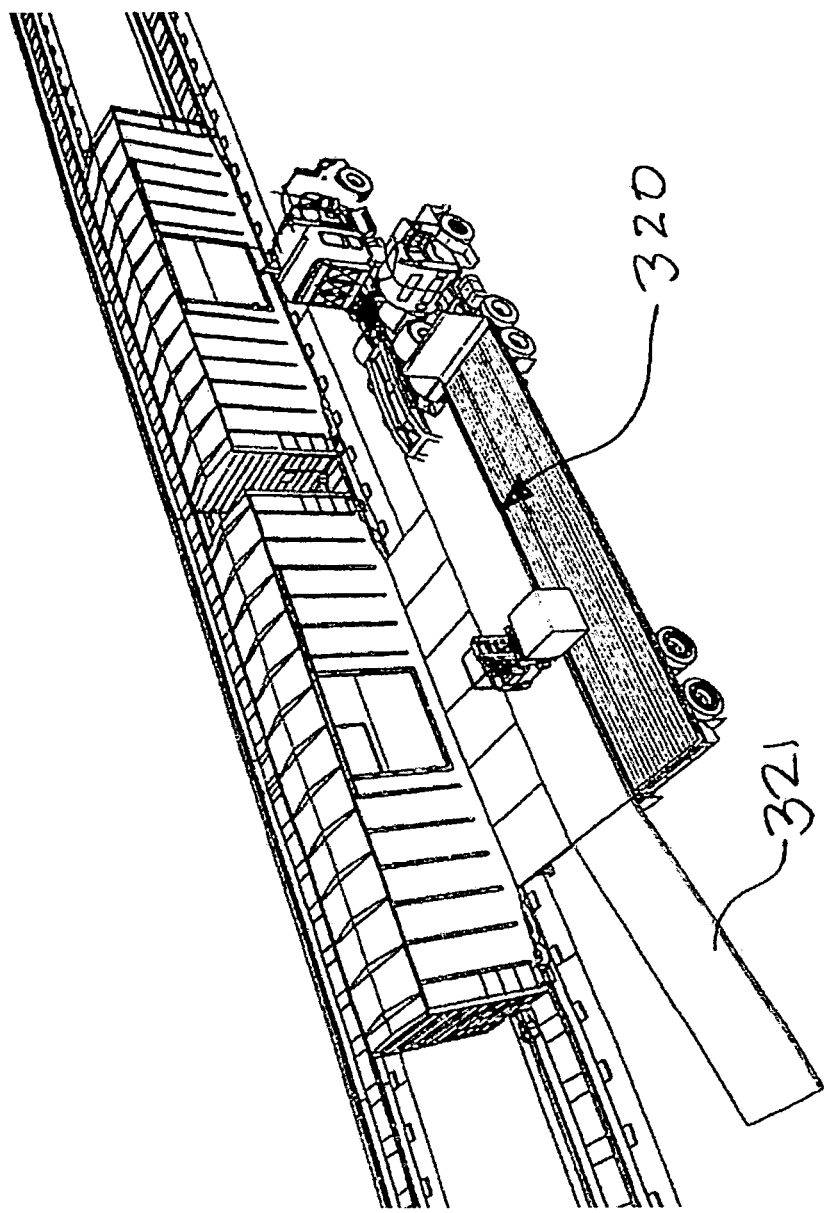
FIG. 26 sets forth a perspective view of a still further alternate embodiment of the present invention mobile distribution platform in a typical loading/unloading operation.

FIG. 26 sets forth a perspective view of a still further alternate embodiment of the present invention mobile distribution platform generally referenced by numeral 320 in atypical loading/unloading operation. Mobile distribution platform 320 serves to illustrate a further example of a one-sided embodiment of the present invention. It will be further noted that mobile distribution platform 320 utilizes six ramps and employs a ramp to ground 321 further adding flexibility to the present invention.

FIGS. 27, 28, 29, and 30 set forth a still further alternate embodiment of the present invention mobile distribution platform generally referenced by numeral 330 in which a plurality of six ramps are pivotally secured to a trailer bed. The use of six pivotally secured ramps provides a further increase in the flexibility of the present invention and accommodates a variety of loading and unloading situations in operation.

With concurrent reference to FIGS. 27, 28, 29 and 30, mobile distribution platform 330 includes a trailer bed 349 supporting a plurality of pivotally secured ramps 331 through 336 along the right edge thereof and further supporting a second plurality of pivotally secured ramps 337 through 342 along the left edge thereof. In a similar construction to that described above, each of the ramps 331 through 336 supports a pair of support jacks 365 through 376 while each of ramps 337 through 342 supports a pair of support jacks 351 through 361.

Figure 27:
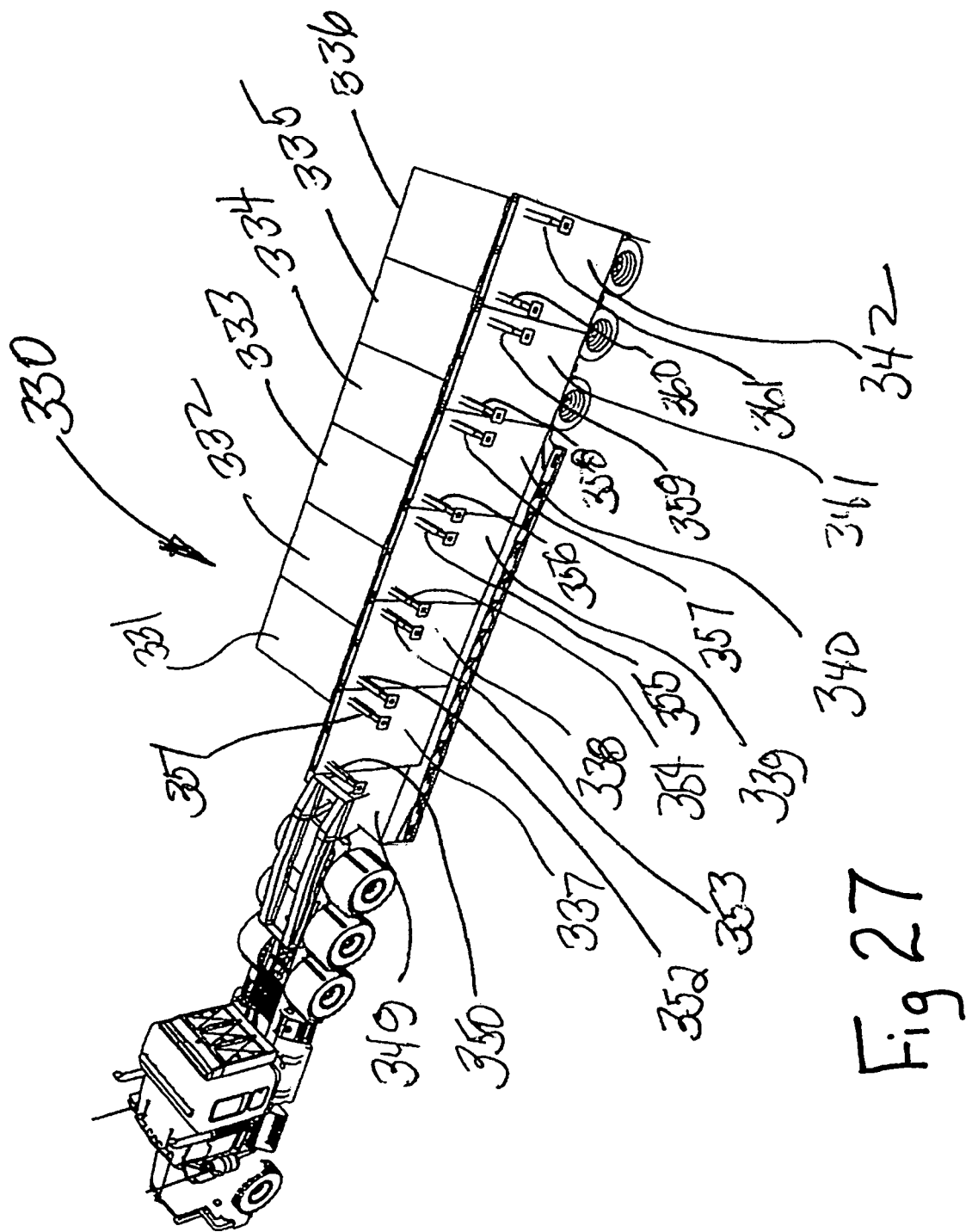
FIG. 27 sets forth a perspective view of a still further alternate embodiment of the present invention mobile distribution platform beginning a transition to its open configuration.
Figure 28:
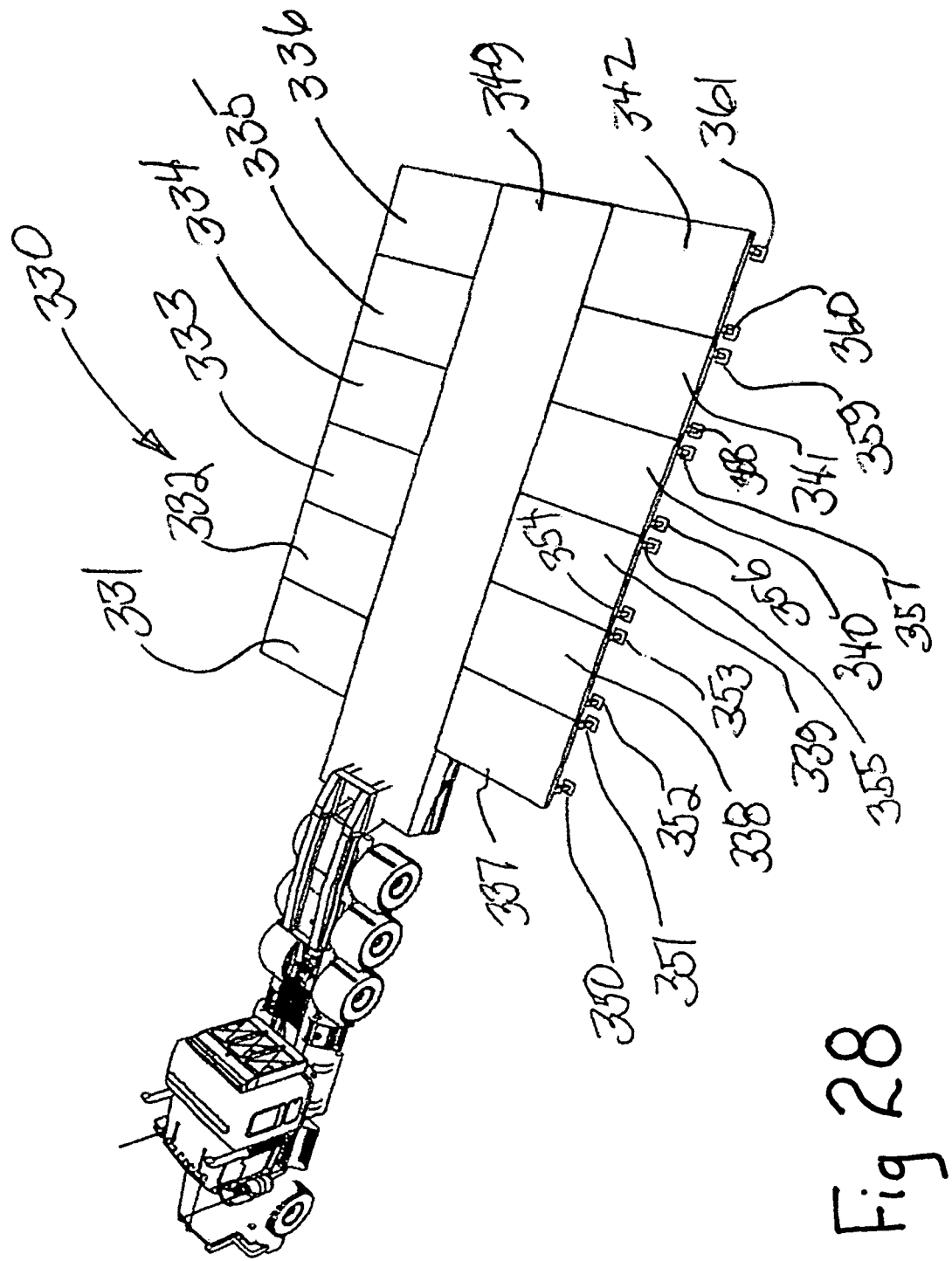
FIG. 28 sets forth a perspective view of the still further alternate embodiment of the present invention mobile distribution platform shown in FIG. 27 in its open configuration.
Figure 29:
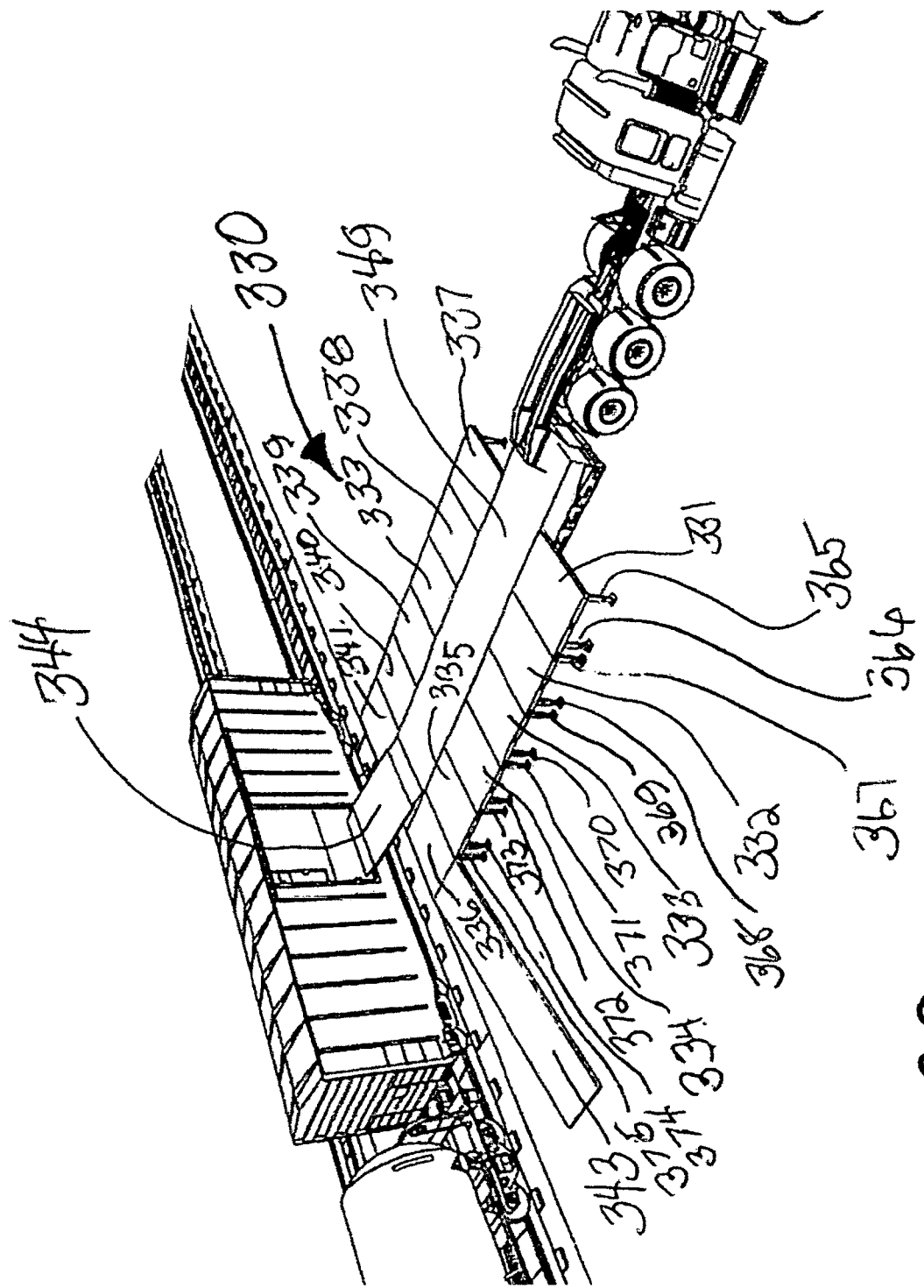
FIG. 29 sets forth a perspective view of the still further alternate embodiment of the present invention mobile distribution platform shown in FIG. 27 in a typical loading/unloading operation.
Figure 30:
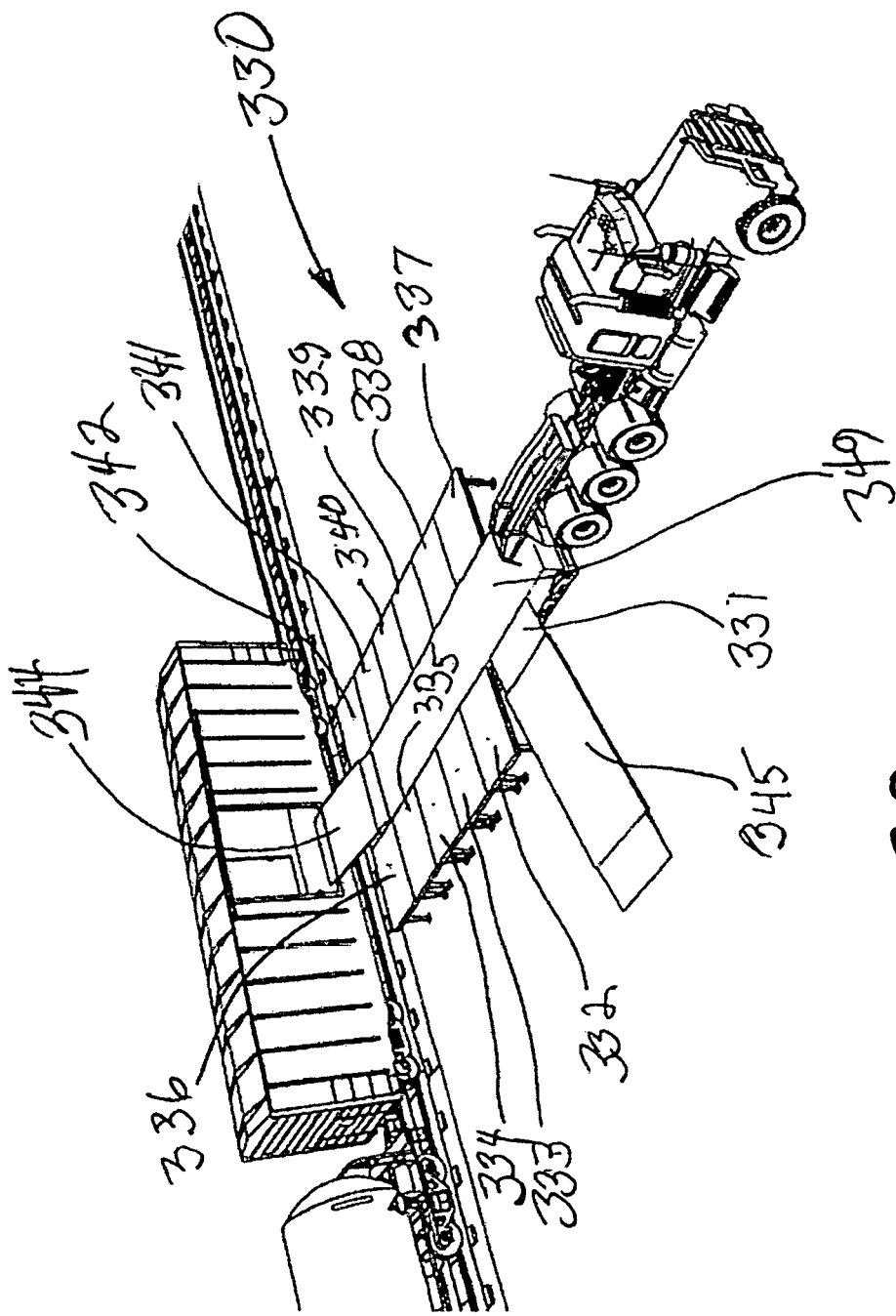
FIG. 30 sets forth a perspective view of the still further alternate embodiment of the present invention mobile distribution platform shown in FIG. 27 in an alternative loading/unloading operation.

FIG. 27 sets forth mobile distribution platform 330 beginning a transition to its open configuration. FIG. 28 sets forth mobile distribution platform 330 in its open configuration. FIG. 29 sets forth mobile distribution platform 330 in a typical loading/unloading operation utilizing an additional ramp to ground 343 and a supplemental ramp 344. The latter is used to bridge the gap from trailer bed 349 to the railroad car being serviced. FIG. 30 sets forth mobile distribution platform 330 in an alternative loading/unloading operation in which a ramp to ground 345 is utilized at the forward and of trailer bed 349 and in which supplemental ramp 344 continues to bridge the gap to the railroad car undersurface.

Figure 31:
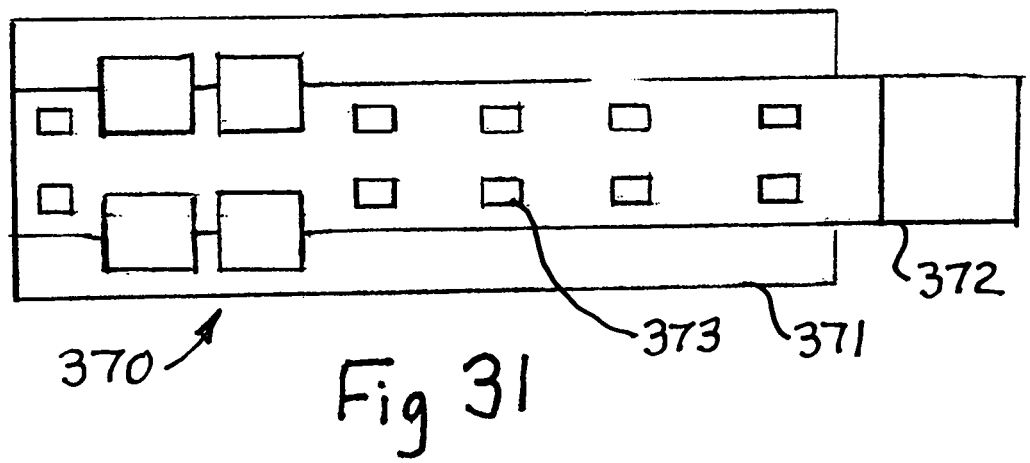
FIG. 31 sets forth a bottom view of a trailer underside of a typical mobile distribution platform constructed in accordance with the present invention showing multiple lifting devices.
Figure 32:
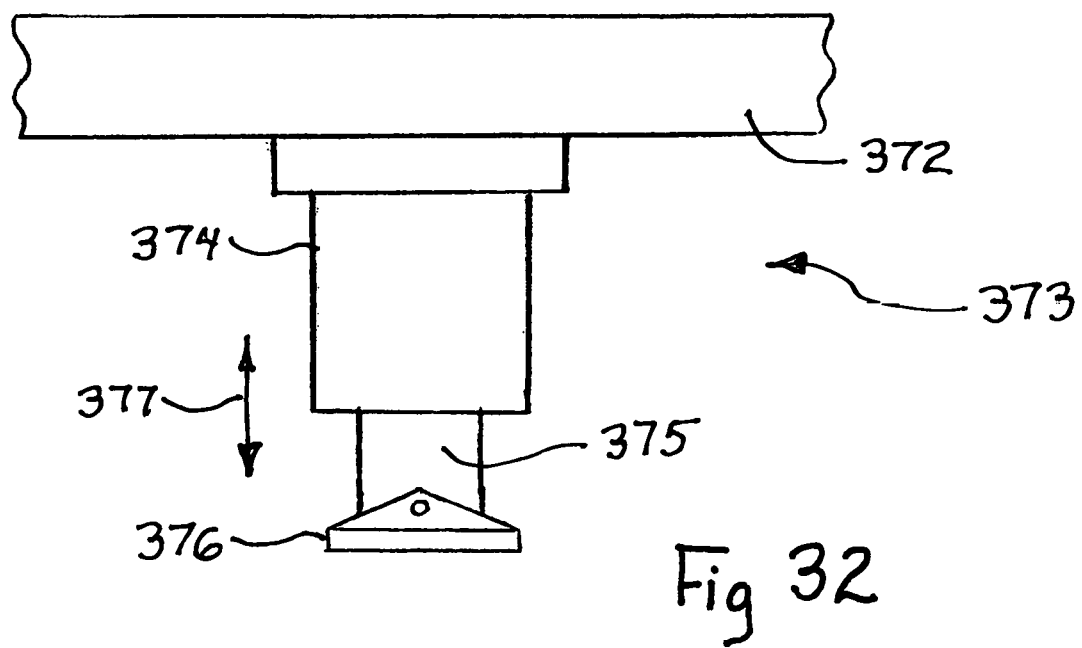
FIG. 32 sets forth a side view of an illustrative trailer lifting device.

FIG. 31 sets forth a bottom view of a trailer bed 371 of a typical mobile distribution platform constructed in accordance with the present invention and generally referenced by numeral 370 which shows a plurality of lifting devices 373. Lifting devices 373 are positioned upon the underside of trailer bed he 72 using conventional attachment (not shown) as illustrated in FIG. 32. Lifting devices 373 are preferably fabricated using conventional hydraulic ram technology and are utilized in lifting trailer bed 372 to accommodate variations in the height of railroad sections being serviced by the present invention mobile distribution platform. The use of lifting devices 373 further facilitates the leveling of trailer bed 372.

FIG. 32 sets forth a side view of an illustrative trailer lifting device generally referenced by numeral 373. As described above, lifting device 373 is preferably fabricated utilizing conventional hydraulic ram technology in which a hydraulic cylinder 374 supports a movable hydraulic ram 375 actuated for movement up and down in the directions indicated by arrows 377. In the preferred fabrication of the present invention a pivotally mounted foot 376 is supported at the bottom end of ram 375 to accommodate uneven ground surfaces, or the like.

FIGS. 33A and 33B set forth side views of an illustrative ramp support jack generally referenced by numeral 380. Thus, with concurrent reference to FIGS. 33A and 33B, support jack 380 comprises a conventional hydraulic ram having a body 383 pivotally secured to ramp 386 by a pivot support 381. Pivot support 381 includes a pivot pin 382 which provides attachment between pivot support 381 and body 383. Within body 383, a hydraulic ram 384 is movable in accordance with conventional fabrication techniques. The outer and of ram 384 supports a foot 385 which is secured to ram 384 by a pivot pin 388. Support jack 380 further includes an extendable hydraulic cylinder 387 coupled between body 383 and ramp 386.

FIG. 33A shows support jack 380 in its travel position in which the body of the support jack is secured against the adjacent surface of ramp 386. This position is configured by the contraction of hydraulic cylinder 387. Hydraulic cylinder 387 is a double acting cylinder having the capability to extend and contract in response to hydraulic power. Thus. With support jack 380 secured by the contraction of hydraulic cylinder 387, support jack 380 is fully configured for travel.

Conversely, FIG. 33B shows support jack 380 in its extended position. The transition from the travel configuration shown in FIG. 33A to the extended position shown in 33B is obtained by applying hydraulic power to hydraulic cylinder 387 causing it to extend and pivot support jack 380 about pivot pin 382 in the direction indicated by arrow 389. This configuration is locked by use of conventional check valve technology within thehydraulic drive apparatus (not shown) to which hydraulic cylinder 387 is operatively coupled. Suffice it to note here that the check valve operation facilitates securing support jack 380 in either the extended position shown in FIG. 33B or the travel configuration shown in FIG. 33A as desired. Once support jack 380 is configured in its extended position appropriate hydraulic power is applied to ram 384 causing extension of ram 384 with respect to body 383 and thereby positioning foot 395 upon the underlying ground or other surface. Return to the travel configuration is provided as ramp 386 is pivoted upwardly and hydraulic cylinder 387 is contracted to pivot support jack 380 about pivot pin 38 in the direction indicated by arrow 379. It will be apparent to those skilled in the art that alternative apparatus such as electric motor and gear combinations may be utilized rather than hydraulic apparatus in pivoting support jack 380 without departing from the spirit and scope of the present invention.

Figure 34:
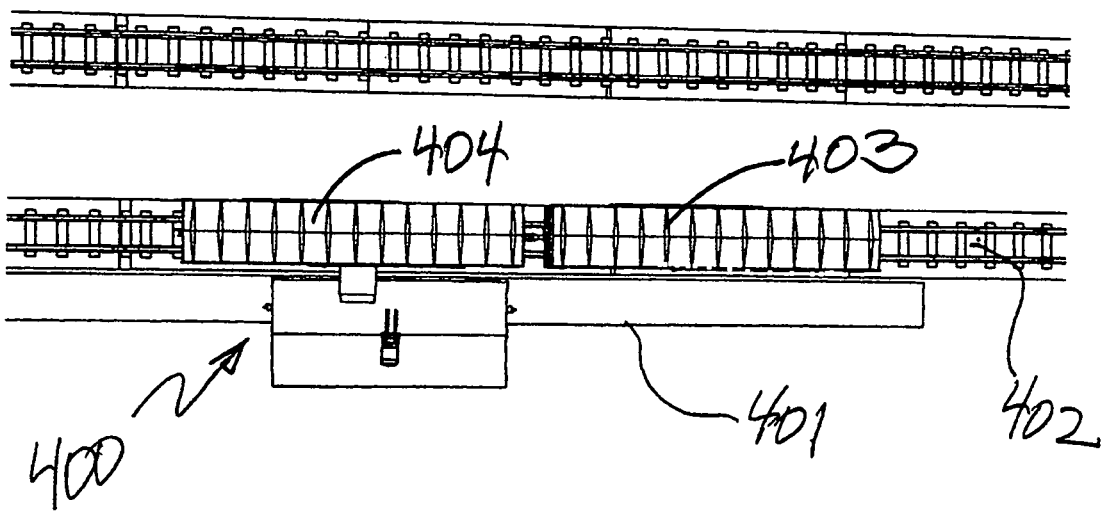
FIG. 34 sets forth a top plan view of a still further alternate embodiment of the present invention mobile distribution platform in an alternative loading/unloading operation.

FIG. 34 sets forth a top plan view of a still further alternate embodiment of the present invention mobile distribution platform, generally referenced by numeral 400, in an alternative loading/unloading operation. In the embodiment shown in FIG. 34 it is anticipated that a supplemental set of rails 401 will be temporarily placed alongside an otherwise conventional set of rails 402. In the illustration shown, an illustrative pair of conventional railroad cars 403 and 404 are shown resting upon rails 402. In the manner set forth below in greater detail, mobile distribution platform 400 utilizes supplemental rails 401 to facilitate movement between locations along rails 402 in order to service railroad cars 403 and 404 without requiring movement of the railroad cars.

Figure 35:
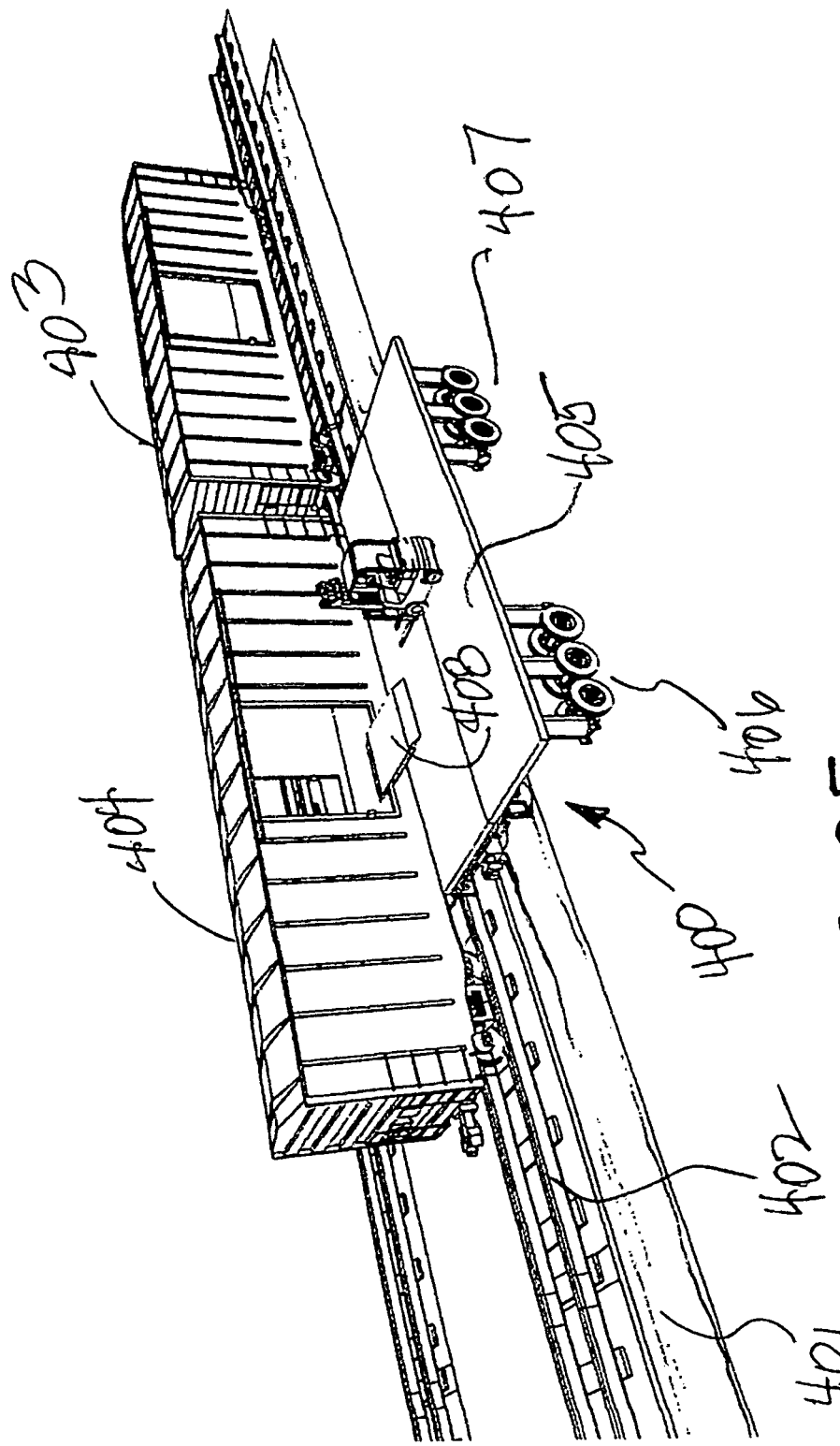
FIG. 35 sets forth a perspective view of the still further alternate embodiment of the present invention mobile distribution platform shown in FIG. 34 in an alternative loading/unloading operation.
Figure 36:
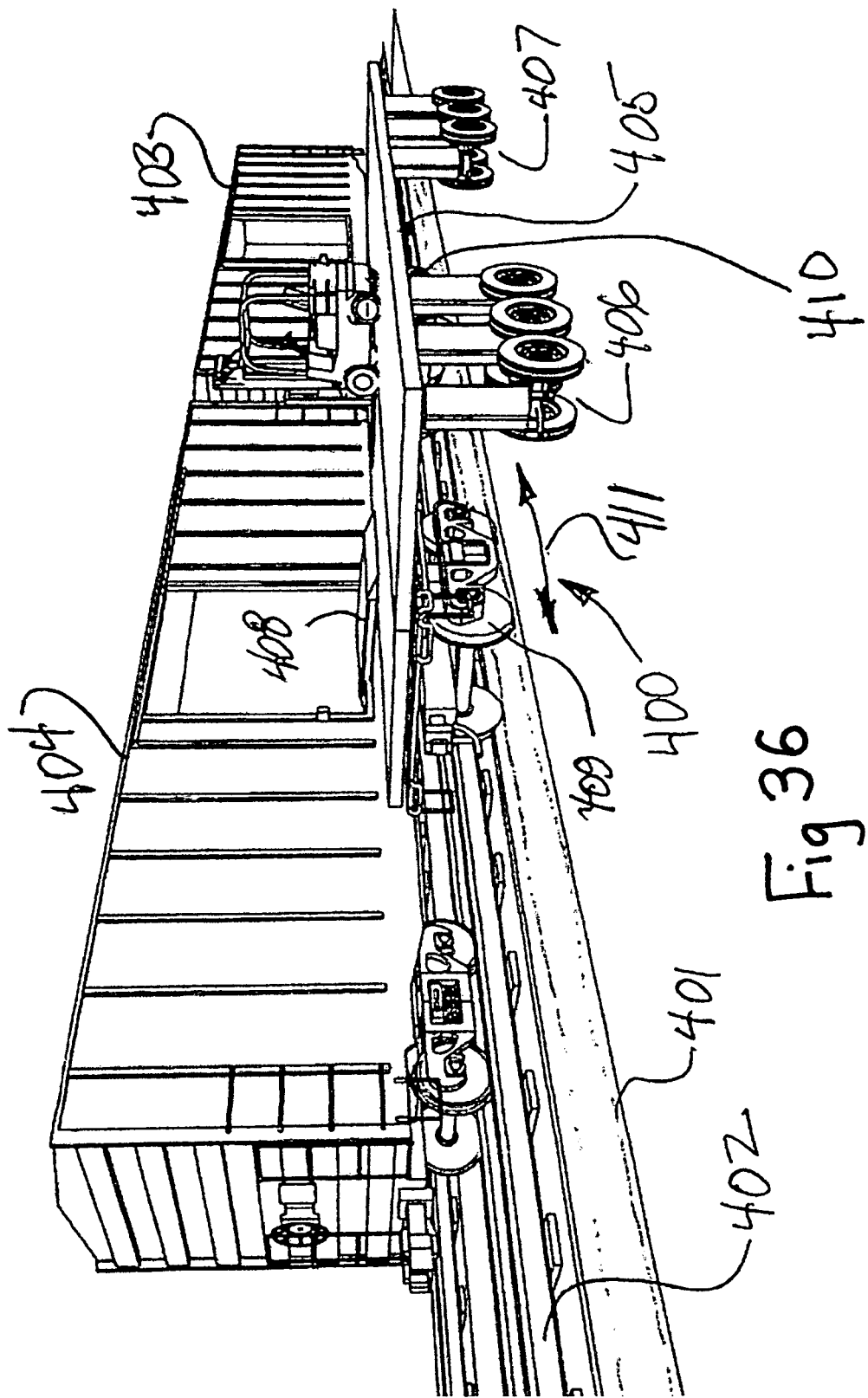
FIG. 36 sets forth a further perspective view of the still further alternate embodiment of the present invention mobile distribution platform shown in FIG. 34 in an alternative loading/unloading operation.

FIG. 35 sets forth a perspective view of mobile distribution platform 400 in an alternative loading/unloading operation which utilizes supplemental rails 401 positioned along and generally parallel to conventional rails 402. The purpose of supplemental rails 401 is better seen in FIG. 36 showing the support of a portion of mobile distribution platform 400 upon sets of conventional railroad car wheels. Returning to FIG. 35, mobile distribution platform 400 includes a platform surface 405 supporting a ramp 408. A plurality of rolling wheels 406 support one corner of platform surface 405 and a second plurality of rolling wheels 407 support the opposite corner of platform surface 405.

FIG. 36 sets forth an enlarged perspective view of mobile distribution platform 400. As described above, mobile distribution platform 400 includes a platform surface 405 supported by pluralities of rolling wheels 406 and 407. As is also described above, mobile distribution platform 400 further includes a pair of supplemental rails 401 which are positioned in a parallel relationship to conventional rails 402. A pair of railroad cars 403 and 404 are shown upon rails 402. A pair of conventional railroad car wheels sets 409 and 410 are positioned beneath platform surface 405 and are supported upon supplemental rails 401. The combination of rolling wheels 406 and 407 together with railroad car wheels sets 409 and 410 facilitate moving mobile distribution platform 400 back and forth in the directions indicated by airrows 411 to move between railroad cars 403 and 404.

What has been shown is an improved apparatus and method for transportation and distribution of products, commodities and resources that provides flexibility of transportation and distribution whereby more effective response to changes of consumer requirements and demands such as those created by natural and man-made disasters may be realized.

That which is claimed is:

1. A mobile distribution platform comprising:
a trailer, defining a trailer bed surface, first and second side edges and apparatus for attachment to an over the road tractor and a plurality of rolling wheels;
a first side defining a side opening;
a first ramp pivotally secured to said first edge movable between a raised travel position and a horizontal loading/unloading position;
a second side formed of a plurality of opposed side ramps pivotally secured to said second side edges each movable between a raised travel position and a horizontal loading/unloading position said plurality of opposed side ramps forming the entirety of said second side;
a plurality of support jacks each defining an attachment end and a foot end and an adjustable length together with adjustment means for adjusting said adjustable length; and
support jack attachment means for securing said attachment ends of said jacks to said first ramp and said plurality of opposed side ramps in said loading/unloading position,
said first ramp and said plurality of opposed side ramps being pivotable to said raised travel positions to facilitate transporting said mobile distribution platform to a selected operation site and being pivotable to said loading/unloading positions, and
said support jack attachment means being used to attach said support jacks to said ramps to stabilize said ramps in a horizontal configuration.

2. The mobile distribution platform set forth in claim 1 wherein said first ramp and said plurality of opposed side ramps each define planar members.

3. The mobile distribution platform set forth in claim 2 wherein said a first ramp includes a first plurality of hinges coupled between said first ramp and said first side edge and wherein said plurality of opposed side ramps each include a second plurality of hinges coupled between said opposed side ramps and said second edge.

4. The mobile distribution platform set forth in claim 3 wherein said trailer bed is generally rectangular defining four corners and wherein said trailer further includes a side frame extending upwardly at each of said corners and defining an upper frame end and a rectangular top frame connecting said upper ends, said side frames and said upper frame combining to form a rigid support frame.

5. The mobile distribution platform set forth in claim 4 further including a plurality of latches each having cooperating first and second interlocking members, said first members being supported upon said side frames and said second members being supported upon said opposed side ramps at positions whereby said first and second members of each opposed side ramp interlock when said opposed side ramp is in its travel position.

6. The mobile distribution platform set forth in claim 5 wherein said support jack attachment means include a removable attachment whereby said support jacks are removable from said ramps of for separate storage during travel.

7. The mobile distribution platform set forth in claim 3 wherein said support jack attachment means include a pivotal attachment between said support jack and said ramp whereby said support jacks are pivotable between a travel position against said ramps and a loading/unloading position generally perpendicular to said ramps.

8. For use in combination with an over the road tractor, a mobile distribution platform configurable in a travel configuration and a loading/unloading configuration, said mobile distribution platform comprising:
a trailer, defining a generally rectangular trailer bed surface defining first and second side edges and having a plurality of rolling wheels;
a tractor attachment for attaching said trailer to an over the road tractor;
a first plurality of planar ramps pivotally secured to said first side edge each movable between a raised travel position forming the entirety of a first trailer side and a horizontal loading/unloading position forming an unobstructed first platform;
a second plurality of planar ramps pivotally secured to said second side edge each movable between a raised travel position forming the entirety of a second trailer side and a horizontal loading/unloading position forming an unobstructed second platform;
a plurality of support jacks each defining an attachment end and a foot end and an adjustable length together with adjustment means for adjusting said adjustable length; and
support jack attachment means for securing said attachment ends of said jacks to said first and second pluralities of ramps in said loading/unloading positions,
said support jack attachment means being used to attach said support jacks to said said first and second pluralities of ramps to stabilize said ramps in a horizontal configuration.

9. The mobile distribution platform set forth in claim 8 wherein said ramps in said first plurality of ramps each include a first plurality of hinges coupled between said first plurality of ramps and said first side edge and wherein said ramps in said second plurality of ramps each include a second plurality of hinges coupled between said second plurality of ramps and said second edge.

* * * * *